United States Patent
Ishida et al.

(10) Patent No.: US 7,514,139 B2
(45) Date of Patent: Apr. 7, 2009

(54) POLYOL COMPONENT FOR POLYURETHANE FORMATION COMPRISING ANIONIC DIOL AND COMPOSITION

(75) Inventors: Hirotaka Ishida, Kyoto (JP); Hiromitsu Nakayama, Kyoto (JP); Masao Nakagawa, Kyoto (JP)

(73) Assignee: Sanyo Chemical Industries, Ltd., Kyoto-shi (JP)

(*) Notice: Subject to any disclaimer, the term of this patent is extended or adjusted under 35 U.S.C. 154(b) by 255 days.

(21) Appl. No.: 10/512,822

(22) PCT Filed: Apr. 30, 2003

(86) PCT No.: PCT/JP03/05553

§ 371 (c)(1),
(2), (4) Date: Jun. 21, 2005

(87) PCT Pub. No.: WO03/093347

PCT Pub. Date: Nov. 13, 2003

(65) Prior Publication Data

US 2006/0182922 A1    Aug. 17, 2006

(30) Foreign Application Priority Data

Apr. 30, 2002 (JP) ............... 2002-129355
Nov. 6, 2002 (JP) ............... 2002-322878

(51) Int. Cl.
C08G 18/14 (2006.01)
B05D 7/26 (2006.01)

(52) U.S. Cl. ............... 428/303; 428/102; 428/105; 428/423.1; 428/423.3; 427/389.9; 427/196; 427/426

(58) Field of Classification Search ............... 428/44, 428/303, 102, 105, 423.1, 423.3; 522/92, 522/127, 135, 157, 174, 189; 427/196, 426, 427/389.9
See application file for complete search history.

(56) References Cited

U.S. PATENT DOCUMENTS 3,936,389 A * 2/1976 King et al. ............. 252/182.17
5,482,777 A * 1/1996 Yamakawa et al. ........ 428/425.9
5,578,376 A * 11/1996 Hashimoto et al. ........ 428/425.9
5,646,237 A * 7/1997 George et al. ............... 528/295
5,702,821 A * 12/1997 Murayama et al. ........ 428/425.9
5,747,597 A * 5/1998 Fujita et al. ................. 525/312
5,795,645 A * 8/1998 Takahashi et al. ........... 428/216
H1760 H * 11/1998 Elango et al. ................. 560/14
5,863,983 A * 1/1999 Wu et al. ..................... 524/839
5,972,515 A * 10/1999 Murayama et al. ........ 428/425.9
6,075,115 A * 6/2000 Putzig et al. ................ 528/279
6,191,214 B1 * 2/2001 Cheng et al. ................ 524/591
6,316,586 B1 * 11/2001 Sunkara et al. ............. 528/300
6,331,606 B1 * 12/2001 Sun ............................ 528/295
6,376,083 B1 4/2002 Murayama et al.
6,479,619 B1 * 11/2002 Duan ......................... 528/286
6,506,853 B2 * 1/2003 Duan ......................... 525/444
2002/0034983 A1 * 3/2002 Saito et al. .................. 464/175

FOREIGN PATENT DOCUMENTS

| JP | 55038693 A | * | 3/1980 |
| JP | 59-6210 | | 1/1984 |
| JP | 59006210 A | * | 1/1984 |
| JP | 59-108023 | | 6/1984 |
| JP | 59108023 A | * | 6/1984 |
| JP | 04169566 A | * | 6/1992 |
| JP | 06274850 A | * | 9/1994 |
| JP | 06274851 A | * | 9/1994 |
| JP | 06290443 A | * | 10/1994 |
| JP | 8-81534 | | 3/1996 |
| JP | 08-081534 | | 3/1996 |
| JP | 09 509191 A | | 9/1997 |
| JP | 2001019735 A | * | 1/2001 |
| WO | 94/28043 A1 | | 12/1994 |
| WO | 02/10248 A1 | | 2/2002 |

OTHER PUBLICATIONS

March's Advanced Organic Chemistry Reactions, Mechanisms and Structures Wiley-Interscience Publication NY 2001 5th ed. p. 1183.*
Japanese Office Action dated Jul. 26, 2005, for corresponding Japanese Application No. 2003-12570.

* cited by examiner

*Primary Examiner*—Elvis O Price
(74) *Attorney, Agent, or Firm*—Westerman, Hattori, Daniels & Adrian, LLP.

(57) ABSTRACT

The present invention provides a polyol component for polyurethane formation comprising an anionic diol (A1); and an anionic diol composition comprising said diol (A1), another active hydrogen atom-containing compound (A2), and/or a compounding ingredient (A3) selected from the group consisting of inert solvents (A31) and additives (A32), with the content of (A2) being not higher than 85 mole % based on the total number of moles of (A1) and (A2).

9 Claims, No Drawings

POLYOL COMPONENT FOR POLYURETHANE FORMATION COMPRISING ANIONIC DIOL AND COMPOSITION

TECHNICAL FIELD

The present invention relates to a polyol component for polyurethane formation comprising an anionic diol, and a composition. More particularly, the invention relates to an anionic diol useful in providing polyurethane resins with moisture-absorbing/releasing properties and dyeability, and to a composition comprising the same.

BACKGROUND ART

It is known in the art that polyurethane resins can be provided with dyeability, moisture-absorbing and other properties by using a high-molecular-weight polyol comprising a sulfonic acid salt group-containing polyester polyol resulting from copolymerization using a sulfonic acid salt group-containing dibasic acid and terephthalic acid and/or isophthalic acid as acid components (cf. e.g. Japanese Kokai Publication Sho-59-6210).

SUMMARY OF THE INVENTION

However, although polyurethane resins produced by using a sulfonic acid salt group-containing polyester polyol have good dyeability and the copolymerization with terephthalic acid and/or isophthalic acid indeed results in improvement in hydrolysis resistance, the level of the hydrolysis resistance is not entirely satisfactory from the practical viewpoint.

It is an object of the present invention to provide a polyol component for polyurethane resin formation excellent in moisture-absorbing/releasing properties and dyeability, and in mechanical characteristics.

When a polyol component is used for polyurethane resin formation, for example, a problem may arise, namely a glycol occurring in excess reacts with an isocyanate, making it difficult to obtain those physical properties originally intended to be possessed by the resulting resin.

It is an object of the present invention to provide an acidic (salt) group-containing dicarboxylic acid diester composition with a reduced free diol content and a great degree of freedom in resin modification.

Another object of the invention is to provide a polyol component for polyurethane resin formation having moisture-absorbing/releasing properties and dyeability which comprises the above composition.

As a result of intensive investigations made by the present inventors in an attempt to accomplish the above objects, they have now completed the present invention.

Thus, the invention provides a polyol component for polyurethane formation which comprises an anionic diol (A1) represented by the general formula (1); an anionic diol composition comprising said diol (A1), another active hydrogen atom-containing compound (A2) and/or a compounding ingredient (A3) selected from the group consisting of inert solvents (A31) and additives (A32), with the content of (A2) being not higher than 85 mole % based on the total number of moles of (A1) and (A2); a method of producing diols which comprises reacting a diol (a2) represented by the general formula (2) with a dicarboxylic acid (a1) having n protonic acid (salt) groups as represented by the general formula (3) or an ester-forming derivative thereof, in a mole ratio of 1.8 to 3/1, in an inert solvent in the presence or absence of a catalyst to give a diol (A1); a method of producing polyurethane resins which comprises reacting the above polyol component or composition with a polyisocyanate component to give an unfoamed or foamed, anionic group-containing polyurethane resin; a polyurethane resin composition obtainable by the above method and having a protonic acid (salt) content of 0.01 to 7 millimoles/g; and a fiber, sheet or textile comprising a polyurethane resin obtainable by the above method and having moisture-absorbing/releasing properties and/or dyeability.

  (1)

  (2)

  (3)

In the general formulas (1) to (3), n represents an integer of 1 to 4; h represents 1 or 2; $M^{h+}$ represents a cation with a valence of h; $Q^-$ represents an anion group of a protonic acid having a pKa of −10 to 4; Z represents the residue of a dicarboxylic acid (a1) having n protonic acid (salt) groups; and A represents the residue of at least one diol (a2) selected from the group consisting of hydrocarbon diols and (poly) oxyalkylene diols.

In the following, the invention is descried in detail.

DETAILED DESCRIPTION OF THE INVENTION

[Anionic diol (A1)]

The anionic diol (A1) represented by the general formula (1) and to be contained in the polyol component for polyurethane formation and the anionic diol composition of the invention is a diester constituted of 2 moles of a diol (a2) represented by the general formula (2) and 1 mole of a dicarboxylic acid (a1) represented by the general formula (3).

The dicarboxylic acid (a1) has n (1 to 4, preferably 1) protonic acid (salt) groups represented by the general formula: $-Q^-(M^{h+})_{1/h}$.

In the general formulas (1) and (3), the anionic group $Q^-$ represents the residue of a protonic acid represented by the general formula $R^0\text{-}Q\text{-}H^+$ ($R^0$ being H or $CH_3$) after removal of $R^0$ and the proton ($H^+$); and the protonic acid $R^0\text{-}Q^-H^+$ has a pKa of −10 to 4 (preferably 0 to 3). [The pKa values for typical protonic acids are described, for example, in "Kagaku Binran (Handbook of Chemistry) (revised 4th edition) Fundamentals Section II" (edited by the Chemical Society of Japan), page II317 (published on September 1993).] With protonic acids having a pKa value lower than −10, the mechanical characteristics of the polyurethane resin may be deteriorated and, with ones having a pKa value higher than 4, the dyeability of the polyurethane resin will be deteriorated.

Such protonic acids include S-containing acids, for example, methanesulfonic acid (1.8), sulfuric acid (1.99) and sulfamic acid (0.99); and P-containing acids, for example, phosphonic acid (1.5), phosphoric acid (2.15) and phosphinic acid (1.23), and the like [the values in the parentheses each being pKa].

The anionic groups ($Q^-$) include S-containing acid-derived anions, for example $-SO_3^-$, $-OSO_3^-$ and $-NHSO_3^-$; and P-containing acid-derived anions, for example $-O-P(=O)(-OR)-O^-$, $-O-P(=O)(-O^-)_2$, $-P(=O)(-OR)-O$ and $-P(=O)(-O^-)_2$. In the formulas, R represents a C1-6 (number of carbon atoms; hereinafter the same shall apply) alkyl group or a C2-4 hydroxyalkyl group.

The protonic acid (salt) group-containing groups represented by the general formula: $-Z[-Q^-(M^{h+})_{1/h}]_n$-[resulting upon removal of two carboxyl groups from (a1)] include ones represented by the general formula:

 (4) or

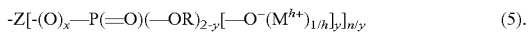 (5).

In the formulas, m represents 0 or 1, X represents O or NH, x represents 0 or 1, y represents 1 or 2; R is as defined above, and n, h and $M^{h+}$ are as defined above referring to the general formula (3). Preferred are ones represented by the general formula (4), in particular ones in which m is 0 [namely sulfonic acid (salt) group-containing groups].

The residue Z represents the residue of (a1) after removal of n protonic acid (salt) groups and two carboxyl groups. The residues Z include hydrocarbon groups (aliphatic, alicyclic and aromatic hydrocarbon groups), which may optionally have one or more substituent species selected from among alkoxy, hydroxyl, cyano, aldehyde and nitro groups and halogen atoms.

As Z, there may be mentioned hydrocarbon groups having a valence of (2+n) as derived from the divalent hydrocarbon groups enumerated below (which may optionally be substituted by an alkoxy, hydroxyl, cyano, aldehyde or nitro group or a halogen atom) by removal of n hydrogen atoms. From the viewpoint of physical properties of polyurethane resins, aromatic hydrocarbon groups are preferred and a phenylene group is more preferred.

Aliphatic hydrocarbon groups (C1-16, preferably C3-12): alkylene and alkenylene groups, for example methylene, ethylene, propylene, butylene, pentylene, hexylene, octylene, decylene, tridecylene, hexadecylene, ethenylene and propenylene, and alkyl- or alkenyl-substituted ethylene groups; alicyclic hydrocarbon groups (C3-16, preferably C5-12); (bi) cycloalkylene and (bi)cycloalkenylene groups, for example cyclopropylene, cyclobutylene, cyclopentylene, (bi)cyclohexylene, cycloheptylene and cyclooctylene, methylenebis(cyclohexylene) and cyclohexyl-substituted ethylene groups; aromatic hydrocarbon groups (C6-16, preferably C6-15): (bi) arylene groups, for example phenylene, tolylene, xylylene, methylene(bisphenylene), naphthenylene and phenyl-substituted ethylene groups; and alkoxy, hydroxyl, cyano, aldehyde or nitro group- or halogen atom-substituted hydrocarbon groups, for example groups represented by the general formula:

 (6)

[in the formula, $R^1$ represents an alkoxy (e.g. methoxy and ethoxy), hydroxyl, cyano, aldehyde or nitro group or a halogen atom (e.g. chlorine and bromine)].

Preferred as Z from the viewpoint of compatibility with another active hydrogen atom-containing compound (A2) and/or a solvent are ones containing not more than C14, in particular not more than C10. Preferred from the hydrolysis resistance viewpoint are ones containing not less than C3, in particular not less than C4.

In the general formulas (1) and (3), the cations ($M^{h+}$) include the proton $H^+$, and monovalent and divalent cations selected from among metals, ammonium groups and amines.

The $M^{h+}$-forming metals include alkali metals (e.g. sodium and potassium), alkaline earth metals (e.g. calcium and magnesium), and other metals (e.g. of the group IIB, IIIA and VIII) (e.g. zinc, aluminum and iron).

The amines include primary, secondary and tertiary, aliphatic, alicyclic, aromatic and heterocyclic amines having a C1-10 hydrocarbyl group (e.g. alkyl, alkenyl, cycloalkyl, aryl and aralkyl group) and/or a C2-4 hydroxyalkyl group (e.g. hydroxyethyl) (including the case where two or more of such groups are bound together to form a heterocycle together with N).

More specifically, there may be mentioned primary amines, for example those primary monoamines to be mentioned later herein [as initiators in preparing (A211)], alkanolamines and polyamines; secondary amines (C2-12), for example di(hydrocarbyl and/or hydroxyalkyl)amines (e.g. dimethylamine, dibutylamine, dicyclohexylamine, diethanolamine and ethylethanolamine), and heterocyclic secondary amines (e.g. morpholine, piperidine and piperazine); and tertiary amines (C3-15), for example tri(hydrocarbyl and/or hydroxyalkyl)amines (e.g. trimethylamine, tributylamine, triethanolamine and diethylethanolamine), and heterocyclic tertiary amines (e.g. N-methylmorpholine and pyridine), and those tertiary amine catalysts which are to be described later herein.

The ammonium groups include $NH_4^+$, and quaternary ammonium amines, for example quaternization products derived from the above-mentioned tertiary amines (e.g. tetraalkylammonium, trialkylbenzylammonium and trialkylhydroxyalkylammonium).

Preferred among those from the viewpoint of dyeability of polyurethane resins are metals, in particular alkali metals and/or alkaline earth metals [hereinafter referred to as alkali (alkaline earth) metals for short].

Specific examples of (a1) include the protonic acid group-containing dicarboxylic acids enumerated below under (a11) to (a15), and salts thereof [salts resulting from conversion of the proton(s) of the protonic group(s) to a cation(s) selected from the group consisting of the above-mentioned alkali (alkaline earth) metals, ammonium groups and amines]. [The protonic acid group may be introduced into the dicarboxylic acids mentioned below either in the form of the protonic acid itself or a salt thereof and, on that occasion, the dicarboxylic acids may be in the free carboxylic acid form or in the form of an ester-forming derivative thereof (to be mentioned later herein).

(a11) Sulfonic acid group-containing dicarboxylic acids

Products of sulfonation of the dicarboxylic acids enumerated later herein (as raw materials for polyester polyol production), for example (a111) aromatic sulfodicarboxylic acids: sulfobenzenedicarboxylic acids (e.g. 5-sulfo-ortho-, iso- and terephthalic acid), and sulfonaphthalenedicarboxylic acids; (a112) aliphatic sulfodicarboxylic acids: sulfoalkane- or alkenedicarboxylic acids (e.g. sulfosuccinic, sulfoglutaric, sulfoadipic, sulfopimelic, sulfosuberic, sulfoazelaic, sulfosebacic and sulfomaleic acid); and (a113) substituted sulfosuccinic acids, for example ones represented by the general formula:

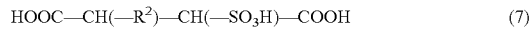 (7)

[in the formula, $R^2$ represents $R^1$ or a C1-13 hydrocarbyl group (e.g. alkyl, alkenyl, cycloalkyl, aralkyl and aryl); and $R^1$ is as defined above referring to the general formula (6).].

(a12) Sulfuric acid group-containing dicarboxylic acids

Sulfate esters of hydroxydicarboxylic acids [e.g. mono- and di-hydroxyalkanedioic acids (e.g. tartronic, malic and tartaric acid)] [products of sulfate esterification of the hydroxyl group(s) with a sulfating agent (e.g. fuming sulfuric acid)].

(a13) Sulfamic acid group-containing dicarboxylic acids

Products of sulfamination of aminodicarboxylic acids (e.g. aspartic acid and glutamic acid) (ones resulting from conversion of the amino group to a sulfamic acid group with fuming sulfuric acid or chlorosulfuric acid).

(a14) Phosphoric acid group-containing dicarboxylic acids

Phosphoric acid esters resulting from phosphate esterification of the hydroxydicarboxylic acids (mentioned above) [products of esterification of the hydroxyl group with a phosphorylating agent (e.g. phosphorus pentoxide and phosphorus oxychloride), and partial alkyl esterification or partial hydroxyalkyl esterification products derived therefrom by reaction with part of the acid (OH) groups with an alcohol or an alkylene oxide (hereinafter referred to as "AO") [C2-8 or more, preferably C2-4, e.g. the one described below under (a22)].

(a15) Phosphonic acid group-containing dicarboxylic acids

Products of phosphonylation of the hydroxydicarboxylic acids (mentioned above) [products resulting from conversion of the hydroxyl group to a phosphonic acid group by phosphite esterification with phosphorus trichloride and isomerization, and products derived therefrom by partial alkyl esterification or partial hydroxyalkyl esterification of part of the acid (OH) groups in the same manner as mentioned above].

The diol (a2) represented by the general formula (2) and constituting the residues A in the general formula (1) include the following:

(a21) Hydrocarbon diols

Aliphatic diols (C2-12 or more, preferably C2-10; alkylene or alkenylene glycols), for example ethylene glycol (hereinafter referred to as "EG" for short), propylene glycol, trimethylene glycol, 1,2-, 1,3-, 2,3- or 1,4-butanediol, 1,6-hexanediol, neopentyl glycol and dodecanediol; alicyclic diols (C4-20 or more, preferably C6-10), for example bis(hydroxymethyl)cyclohexane, cyclohexane-1,2-, 1,3- or 1,4-diol, cyclopentane-1,2- or 1,3-diol, and hydrogenation products derived from dihydric phenols (such as mentioned below) (e.g. hydrogenated bisphenol A); araliphatic diols (C8-20 or more), for example dihydroxymethylbenzene(xylylene glycol) and bis(hydroxyethyl)benzene; and polybutadiene-based polyols such as mentioned later herein under (A213).

(a22) (Poly)oxyalkylene diols

Adducts of compounds having two active hydrogen atoms [e.g. the above-mentioned hydrocarbon diols, the primary monoamines, dihydric phenols and dicarboxylic acids to be mentioned later herein as raw materials of (A211) and (A212)] with an AO [C2-8 or more, preferably C2-4: e.g. ethylene oxide, propylene oxide, tetrahydrofuran, and 3-methyltetrahydrofuran (hereinafter referred to as "EO", "PO", "THF" and "MTHF", respectively, for short), 1,2- and 2,3-butylene oxide, C5-8 α-olefin oxides, and substituted (phenyl- or halogen-substituted) AO (e.g. styrene oxide and epichlorohydrin), or a combination of two or more of these (random and/or block)] (1 to 70 moles, preferably 1 to 40 moles):

(a221) Monooxyalkylene (C2-4) diols, for example diethylene glycol and dipropylene glycol;
(a222) N,N-dihydroxyalkyl(C2-4)monohydrocarbylamines (C1-10): N,N-dihydroxyalkyl-substituted derivatives of the primary monoamines to be mentioned later herein, for example dihydroxyethylbutylamine, and dihydroxyethylaniline; and
(a223) Polyether diols [diols among the (A211) species to be mentioned later herein], for example polyalkylene (C2-4) glycols [e.g. polyethylene glycol, polypropylene glycol and polytetramethylene ether glycol (hereinafter respectively referred to as "PEG", "PPG" and "PTMG" for short)] and dihydric phenol-derived polyoxyalkylene (C2-4) ethers [e.g. bisphenol A-AO adducts, and the like].

Preferred among the (a2) species from the viewpoint of dyeability and mechanical characteristics of polyurethane resins are those having a number average molecular weight [hereinafter, "Mn" for short; determined by gel permeation chromatography (GPC); hereinafter the same shall apply] of not higher than 1,000, more preferably those having an Mn of not higher than 400, in particular those having an Mn of not higher than 200. Among the diols having such an Mn, (poly)alkylene glycols are preferred, and PEG and EG are more preferred, from the viewpoint of moisture-absorbing properties, dyeability and mechanical characteristics of polyurethane resins.

Among the anionic diols (A1), 5-sulfoisophthalic acid alkylene glycol (in particular EG) diester metal salt is preferred, and an alkali (alkaline earth) metal salt, in particular an alkali metal salt, is more preferred, from the viewpoint of dyeability and mechanical characteristics of polyurethane resins.

(A1) can be produced by reacting the (a1) component [dicarboxylic acid (a1) or an ester-forming derivative thereof; hereinafter the same shall apply] with the diol (a2) in an inert solvent (esterification or transesterification).

The ester-forming derivatives include di-lower-alkyl (C1-4) esters of (a1) (e.g. methyl, ethyl, n- and iso-propyl, and n-, i-, sec- and t-butyl ester), acid anhydrides and acid halides (e.g. acid chlorides). From the reactivity viewpoint, dialkyl (C1-2) esters, in particular dimethyl esters, are preferred. From the viewpoint of dyeability of polyurethane resins, dimethyl sulfobenzenedicarboxylates (in particular dimethyl 5-sulfoisophthalate) and salts of the sulfonic acids are preferred and, further, metal salts thereof, in particular alkali metal salts and/or alkaline earth metal salts, are preferred.

From the reaction rate viewpoint, the (a2)/(a1) component mole ratio is preferably at least 1.8/1, more preferably at least 1.9/1, most preferably at least 2.0/1; and, from the viewpoint of physical properties of polyurethane resins, it is preferably at most 3/1, more preferably at most 2.9/1, most preferably at most 2.8/1.

The inert solvent is not particularly restricted but may be any of those which are inert to the reaction (esterification or transesterification) and can dissolve the components (a1), (a2) and (A1). It may be one or a mixture of two or more of those to be mentioned later herein under (A31). When (A1) is used as a polyol component for polyurethane formation, amide solvents [dimethylformamide and dimethylacetamide (hereinafter respectively referred to as "DMF" and "DMA" for short), and N-alkyl(C1-3: methyl, ethyl, n- and iso-propyl)-2-pyrrolidones] are preferred in view of their reactivity and the solubility of polyurethane resins therein. DMF is more preferred and DMA is most preferred.

The solvent/(a1) component ratio is generally 3/1 to 10/1 and, from the solution viscosity viewpoint, it is preferably 4/1 to 7/1. The solvent/[(a1) component+(a2)] ratio is generally 2/1 to 9/1, preferably 3/1 to 7/1.

In the preceding and subsequent description, "ratio", "part(s)" and "%" respectively mean "ratio by weight", "part(s) by weight" and "% by weight", unless otherwise specified.

The reaction of the (a1) component with (a2) is carried out in the presence or absence of a catalyst. An ordinary esterification or transesterification catalyst can be used as the catalyst. For example, there may be mentioned organic acid (C2-8 carboxylic acid, e.g. acetic acid, propionic acid, octanoic acid and maleic acid) salts of a metal selected from the group consisting of alkali metals (e.g. sodium and potassium), alkaline earth metals (e.g. magnesium and calcium), group IIB metals (e.g. zinc and cadmium), group VIIB metals (e.g. manganese) and group VIII metals (e.g. iron, cobalt and nickel). Among them, acetic acid salts are preferred from the reaction rate and coloration viewpoint. More preferred are acetic acid salts of group VIIB metals, in particular manganese acetate.

From the reaction rate and coloration viewpoints, the catalyst is preferably used in an amount of 0.01 to 5%, particularly preferably 0.03 to 3%, based on the weight of (a2).

The reaction of the (a1) component with (a2) can be carried out under ordinary esterification or transesterification conditions, for example at a temperature of 110 to 190° C. at ordinary pressure or under reduced pressure (0.098 to 0.001 MPa) while removing the byproduct water or alcohol to expedite the esterification or transesterification reaction.

By reacting the (a1) component with (a2) (for esterification or transesterification) in an inert solvent, it becomes possible to produce (A1) with a low unreacted (a2) content. The content of the unreacted (a2) is preferably not higher than 4%, more preferably not higher than 3%, based on the weight of (A1).

[Polyol Component (A)]

The polyol component of the invention comprising the anionic diol (A1) is used as at least part of the component (A) in polyurethane formation, namely in producing an unfoamed or foamed polyurethane resin by reacting the polyol component (A) with a polyisocyanate component (B).

The polyol component (A) according to the invention may contain, in addition to (A1), another [other than (A1)] active hydrogen atom-containing compound (hereinafter referred to as "active H compound" for short) (A2), according to need. As (A2), there may be mentioned polyols [high-molecular-weight polyols (A21) and/or low-molecular-weight polyols (A22)], other (than polyols) active H compounds (A23), and combinations of two or more of these.

The high-molecular-weight polyol (A21) has an OH equivalent (hydroxyl value-based molecular weight per hydroxyl group) of at least 250, preferably 250 to 3,000, more preferably 350 to 2,500, most preferably 400 to 2,000.

Generally, (A21) has an Mn of 500 to 5,000 or higher, preferably 700 to 4,500, more preferably 900 to 4,000; and preferably has a weight average molecular weight (hereinafter referred to as "Mw" for short; determined by GPC; hereinafter the same shall apply) of not higher than 6,000, more preferably 700 to 4,000. (A21) has 2 to 8 or more, preferably 2 or 3, more preferably 2, hydroxyl groups.

(A21) comprises at least one of the (A211) to (A215) mentioned below. Among them, the (A211) species are preferred.

(A211) Polyether polyols

As (A211), there may be mentioned compounds having a structure resulting from addition of one or two or more (random and/or block) of the AOs mentioned above (e.g. EO, PO and THF) to an initiator having at least 2 (2 to 8 or more) active hydrogen atoms, and mixtures of two or more of these. The initiators include polyfunctional active H compounds [compounds having two or more active hydrogen atom-containing groups (e.g. hydroxyl, amino, carboxyl and/or mercapto groups)), and primary monoamines; for example, there may be mentioned polyhydric alcohols, polyhydric phenols, amines, polycarboxylic acids and hydroxy-carboxylic acids.

The polyhydric alcohols include dihydric alcohols, for example, the hydrocarbon diols described above under (a21) and the monooxyalkylene diols (a222) described above under (a221); and at least trihydric (trihydric to octahydric or further polyhydric) polyols, for example (cyclo)alkanepolyols and intramolecular or intermolecular dehydration products derived therefrom [e.g. glycerol, trimethylolpropane, 1,2,6-hexanetriol, cyclohexanetriol, pentaerythritol, sorbitol, mannitol, sorbitan, diglycerol, other polyglycerols, and dipentaerythritol], sugars and derivatives thereof (glycosides) (e.g. sucrose, glucose, fructose, mannose, lactose and methylglucoside).

The polyhydric phenols include dihydric phenols, for example monocyclic dihydric phenols (e.g. hydroquinone, catechol and resorcin), bisphenols (e.g. bisphenol A, bisphenol F, bisphenol C and bisphenol S), and trihydric or further polyhydric phenols, for example monocyclic phenols (e.g. pyrogallol and phloroglucin) and monohydric phenol (e.g. phenol)-formaldehyde oligomeric condensates (e.g. novolak resins and resol intermediates).

As the polycarboxylic acids and hydroxyl-carboxylic acids, there may be mentioned those given later herein as raw materials of (A212).

The amines include primary monoamines, alkanolamines and polyamines.

The primary monoamines include monohydrocarbylamines, for example C1-20 aliphatic, alicyclic, araliphatic and aromatic monoamines [monoalkylamines (e.g. methyl-, ethyl-, n-butyl- and octylamine), cyclohexylamine, benzylamine, arylamines (e.g. aniline, toluidine and naphthylamine)]; and alkanolamines [mono-, di- and trialkanolamines (C2-4 in each hydroxyalkyl group), for example mono-, di- and triethanolamine].

The polyamines include diamines and polyamines having three to five or more primary and/or secondary amino groups and, thus, there may be mentioned, for example, aliphatic, alicyclic, araliphatic and aromatic polyamines [for example, polyamines corresponding to (B1) to be mentioned later herein (resulting from substitution of amino groups for isocyanato groups) (e.g. ethylenediamine, hexamethylenediamine, isophoronediamine, dicyclohexylmethanediamine, xylylenediamine, tolylenediamine, and diethyltolylenediamine), and polyalkylene (C2-4)polyamines (e.g. diethylenetriamine and triethylenetetramine)], heterocyclic polyamines, for example those described in Japanese Kokoku Publication Sho-55-21044 [e.g. piperazine, aminoalkyl (C2-6) piperazine (e.g. aminoethylpiperazine) and 1,4-diaminoalkyl (C2-6) piperazine (e.g. 1,4-diaminoethylpiperazine)]; and partial alkyl-substituted derivative of these polyamines [e.g. N-alkyl (C1-4)- or N,N— or N,N'-dialkyl (C1-4)-substituted diamines (e.g. ethylenediamine)].

As specific examples of (A211), there may be mentioned polyether diols, for example polyalkylene glycols [e.g. PEG, PPG, PTMG, poly-3-methyltetramethylene ether glycol, copolymerized polyalkylene ether diols [THF/EO copolymer diols, THF/MTHF copolymer diols] (copolymerization ratio: 1/9 to 9/1, for example)], and aromatic ring-containing polyoxyalkylene diols [polyoxyalkylenebisphenol A (bisphenol A-EO and/or PO adducts etc.)]; at least trifunctional polyether polyols, for example polyoxypropylenetriols [e.g. glycerol-PO adducts]; and coupling products of one or more of these by means of an alkylene (C1-4) dihalide (e.g. coupling products of two polyether polyol molecules by means of methylene dichloride). Among them, polyether diols are preferred, and PTMG is particularly preferred.

(A212) Polyester polyols (A212) comprises at least one of the following (A2121) to (A2124).

(A2121) Condensed polyester polyols

As (A2121), there may be mentioned compounds having a structure resulting from (poly)condensation of a polyol (a diol, if necessary an at least trihydric polyol) and a polycarboxylic acid (a dicarboxylic acid, if necessary an at least tribasic polycarboxylic acid), and mixtures of two or more of them. (A2121) can be produced by subjecting a polyol with a polycarboxylic acid (a dicarboxylic acid, if necessary an at least tribasic polycarboxylic acid) or an ester-forming derivative thereof to condensation, or by reacting a polyol with a polycarboxylic acid anhydride and an AO.

Employable as the polyol are low-molecular-weight polyols and/or polyether polyols. As the low-molecular-weight polyols, there may be mentioned low-molecular-weight diols, and combinations thereof with a small proportion (e.g. 10 equivalent % or less) of an at least trihydric low-molecular-weight polyol.

The low-molecular-weight diols include, for example, the above-mentioned hydrocarbon diols (a21) (e.g. EG, 1,4-butanediol and 1,6-hexanediol), the monooxyalkylene diols (a221) (e.g. diethylene glycol), and the dihydroxyalkylmonohydrocarbylamines (a222) (e.g. N-methyldiethanolamine); the at least trihydric low-molecular-weight polyols include, for example, the polyhydric alcohols mentioned hereinabove as initiators for (A211) (e.g. glycerol and trimethylolpropane), and amine-type polyols [N-hydroxyalkyl-substituted derivatives of the polyamine mentioned above as initiators for (A211), for example tetrakis(hydroxypropyl)ethylenediamine, and trialkanolamines, for example triethanolamine]; and the polyether polyols include ring-opening polymers derived from an AO or AOs and the polyfunctional active H compound- or primary monoamine-AO adducts mentioned above referring to (A211), each having an OH equivalent of at most 500, for example polyoxyethylene polyols (e.g. PEG), polyoxypropylene polyols (e.g. PPG), polyoxytetramethylene polyols (e.g. PTMG), and bisphenol A-PO and/or EO adducts.

Employable as the polycarboxylic acid are dicarboxylic acids, and dicarboxylic acids in combination with a small proportion (e.g. 10 equivalent% or less) of a tribasic, tetrabasic or further polybasic polycarboxylic acid. Examples thereof include C2-12 saturated or unsaturated aliphatic polycarboxylic acids, for example saturated dicarboxylic acids (e.g. succinic, adipic, azelaic, sebacic, and dodecanedicarboxylic acid), unsaturated dicarboxylic acids (e.g. maleic, fumaric, and itaconic acid), tricarboxylic acids (e.g. hexanetricarboxylic acid); C8-15 aromatic polycarboxylic acids, for example dicarboxylic acids (e.g. terephthalic, isophthalic, and phthalic acid), tri- and tetracarboxylic acids (e.g. trimellitic and pyromellitic acid); and C6-40 alicyclic polycarboxylic acids (e.g. dimer acids). The ester-forming derivatives include acid anhydrides, lower alkyl (C1-4) esters, and acid halides (e.g. acid chloride).

(A2122) Polylactone polyols

As (A2122), there may be mentioned compounds having a structure resulting from ring-opening polymerization of a lactone (C4-15) with a polyol as an initiator, and mixtures of two or more of them. (A2122) can be produced by ring-opening polymerization of a lactone onto a polyol, or by condensation of a polyol with a hydroxy-carboxylic acid.

As the lactone, there may be mentioned C4-15 ones, for example ε-caprolactone, γ-butyrolactone and γ-valerolactone. As the hydroxy-carboxylic acid, there may be mentioned C3-15 ones, for example those corresponding to the lactones mentioned above (resulting from ring opening) (e.g. hydroxycaproic acid), lactic acid, m-, p- and o-hydroxybenzoic acid, etc. Employable as the polyol are low-molecular-weight polyols and/or polyether polyols; and they include the low-molecular-weight diols and/or at least trihydric low-molecular-weight polyols mentioned above referring to (A2121), and polyether polyols (diols and/or at least trihydric polyols) having an OH equivalent of not higher than 500.

(A2123) Polycarbonate polyols (A2123) can be obtained by subjecting a polyol to reaction (condensation) with an alkylene (C2-4) carbonate (e.g. ethylene carbonate) or a lower dialkyl (C1-4) carbonate ester (e.g. dimethyl carbonate, diethyl carbonate, and diisopropyl carbonate) or to reaction (transesterification) with diphenyl carbonate. Employable as the polyol for the production of these are the same low-molecular-weight polyols and/or polyether polyols as mentioned above referring to (A2122).

(A2124) Castor oil-based polyols

As (A2124), there may be mentioned castor oil (ricinolic acid triglyceride), and transesterification products derived therefrom. The latter are obtainable by transesterification between castor oil and a polyol. Employable as the polyol are the same low-molecular-weight polyols and/or polyether polyols as mentioned above referring to (A2122).

(A213) Polybutadiene-based polyols

As (A213), there may be mentioned polybutadiene polyols, and hydrogenation products derived therefrom. The polybutadiene polyols include, for example, hydroxyl group-terminated butadiene homopolymers and copolymers [e.g. butadiene/styrene copolymers and butadiene/acrylonitrile copolymers] (copolymerization ratio: 100/0 to 70/30), the polybutadiene structures of which include the 1,2-vinyl structure, 1,4-trans structure and 1,4-cis structure, and a mixed structure comprising two or more of these structures [the 1,2-vinyl/1,4-trans/1,4-cis ratio being preferably (10 to 30)/(50 to 70)/(10 to 30)]. The hydrogenation products derived therefrom include those whose hydrogenation percentage is 20 to 100%.

(A214) Acrylic polyols

The acrylic polyols (A214) are products of hydroxyl group introduction into acrylic copolymers [copolymers of alkyl (C1-20) (meth)acrylate(s) or of the same with another monomer (e.g. styrene)], and hydroxyethyl(meth)acrylate is mainly used for the hydroxyl group introduction.

(A215) Polymer polyols

As (A215), there may be mentioned those obtainable by polymerizing in situ a vinyl monomer in a polyol and those obtainable by grafting of a polyol and a vinyl monomer-based polymer onto each other (the former being preferred); and the polymer content is, for example, 5 to 70%. Employable as the polyol are the above mentioned (A211) and/or (A212), and mixtures of one or more of these and one or more of the above-mentioned low-molecular-weight polyols (the mixing ratio being 100/0 to 20/80, for example).

The vinyl monomers include acrylic monomers (e.g. (meth)acrylonitrile, alkyl (C1-20) (meth)acrylates (e.g. methyl methacrylate)], aromatic vinyl monomers (e.g. styrene), aliphatic hydrocarbon monomers [e.g. C2-8 or higher alkenes and alkadienes (e.g. α-olefins and butadiene)], and combinations of two or more of these (e.g. the combination of acrylonitrile/styrene (the copolymerization ratio being 100/0 to 20/80)].

The low-molecular-weight polyols (A22) include low-molecular-weight diols and at least trihydric (trihydric to octahydric or further polyhydric) low-molecular-weight polyols, each having an OH equivalent lower than 250. Employable as (A22) are the low-molecular-weight diols and/or at least trihydric low-molecular-weight polyols mentioned above referring to (A2121) (e.g. dihydric alcohols and at least trihydric polyhydric alcohols, dihydroxyalkylmonohydrocarbylamines, and amine-based polyols), and polyether polyols having an OH equivalent lower than 250 (diols and/or at least trihydric polyols) [polyether polyols having a structure resulting from addition of one or more AOs to such a polyol or to such an initiator as described above referring to (A211) (e.g. a polyhydric alcohol, polyhydric phenol, or amine).

The other active H compounds (A23) include polyamines (A231), amino alcohols (A232), and monofunctional active H compounds (A233).

As (A231), there may be mentioned the aliphatic, alicyclic, araliphatic and aromatic polyamines, and heterocyclic polyamines mentioned hereinabove as initiators for (A211); and polyether polyamines, for example polyol [the above-mentioned low-molecular-weight polyol (A22) and/or polyether polyol (A211)]-derived poly(aminopropyl ether) compounds (produced by cyanoethylation of the hydroxyl groups of the polyol, followed by hydrogenation); and these include high-molecular-weight polyamines (A2311) having an equivalent (primary/secondary amine value-based molecular weight per primary/secondary amino group) of 250 to 3,000 or more, and low-molecular-weight polyamines (A2312) having an equivalent of lower than.250. These polyamines may be used in a form in which their amino groups are blocked (for example a ketimine-blocked or aldimine-blocked form as described in Japanese Kokai Publication Sho-54-118466; e.g. in a methyl ethyl ketimine form).

As (A232), there may be mentioned mono- and dialkanolamines (C2-4 in each hydroxyalkyl group), for example monoethanolamine and diethanolamine; and hydrocarbyl (C1-10) alkanolamines (C2-4 in the hydroxyalkyl group), for example ethylethanolamine and butylethanolamine.

As (A233), there may be mentioned the above-mentioned compounds having one active hydrogen atom-containing group, for example monofunctional amino compounds (A2331) and monofunctional hydroxyl compounds (A2332).

As (A2331), there may be mentioned monofunctional primary amino compounds, for example the monohydrocarbyl (C1-20, preferably C1-4; hereinafter the same shall apply) amines (e.g. butylamine) mentioned above as initiators for (A211), and tertiary amino group-containing primary amino compounds [produced by converting part of the amino groups (so as to leave one amino group) of the above-mentioned (A231) to a tertiary amino group(s) (by dihydrocarbylation), for example N,N-dihydrocarbyl-substituted derivatives of aliphatic, alicyclic, araliphatic and aromatic diamines (e.g. N,N-dimethylaminoethylamine)]; as well as monofunctional secondary amino compounds, for example derivatives of the above-mentioned compounds resulting from conversion of the primary amino group to a secondary one (by hydrocarbylation) [e.g. dihydrocarbylamines (e.g. dibutylamine), N,N,N'-trihydrocarbyl-substituted aliphatic, alicyclic, araliphatic and aromatic diamines (e.g. N,N-dimethylaminoethylmethylamine)].

As (A2332), there may be mentioned hydrocarbyl alcohols [C1-20 aliphatic, alicyclic and aromatic monohydric alcohols, for example alkanols (e.g. methyl, ethyl, n- and isopropyl, and butyl alcohol), cycloalkanols (e.g. cyclohexyl alcohol), and benzyl alcohol]; as well as tertiary amino group-containing monohydric alcohols, for example dihydrocarbylalkanolamines [hydroxyalkyl(C2-4)-substituted derivatives of the above-mentioned dihydrocarbylamines (e.g. diethylethanolamine and dibutylethanolamine)], and AO adducts derived therefrom (the number of moles added being 1 to 5 or more).

From the viewpoint of moisture-absorbing/releasing properties, dyeability and mechanical properties of polyurethane resins, the polyol component (A) to be used in the practice of the invention comprises (A1) preferably in a proportion of at least 15 mole %, more preferably 30 to 85 mole %, most preferably 40 to 70 mole %. The content ratio of (A2) can be adequately selected according to the intended use of the polyurethane resins and the performance characteristics required of the same. Generally, such proportions as mentioned below are preferred.

The high-molecular-weight polyol (A21) accounts for not more than 85 mole %, in particular for 20 to 80 mole %, the low-molecular-weight polyol (A22) for not more than 85 mole %, in particular for 20 to 80 mole %, the high-molecular-weight polyamine (A2311) for a proportion such that the same and (A21) in total (soft segments) will amount to not more than 85 mole %, in particular to 20 to 80 mole %, and the low-molecular-weight polyamine (A2312) for a proportion such that the same and (A22) in total (low-molecular-weight polyfunctional active H compounds) will amount to not more than 85 mole %, in particular to 20 to 80 mole %.

The chain terminator [amino alcohol (A232) and/or monofunctional active H compound (A233)] is used in a proportion such that a polyurethane resin having an Mn within a specified range (to be mentioned later herein) may be obtained.

[Anionic Diol Composition]

The anionic diol composition according to another aspect of the invention comprises the above-mentioned (A1), the above-mentioned (A2) and/or a compounding ingredient (A3) on condition that the content of (A2) does not exceed 85 mole % based on the total number of moles of (A1) and (A2)

When the content of (A2) exceeds 85 mole %, the protonic acid (salt) group content decreases and good moisture-absorbing/releasing properties and good dyeability are hardly exerted. Preferably, the content of (A2) is not more than 80 mole %, in particular not more than 70 mole %.

Employable as (A3) is an inert solvent (A31) and/or an additive (A32).

The inert solvent (A31) is not particularly restricted but may be any of those which will not react with the isocyanato group under polyurethane formation conditions but can dissolve (A1) and (A2). As (A31), there may be mentioned dimethylformamide (hereinafter, DMF for short) and solvents having no active hydrogen atom. The latter include other amide solvents [e.g. dimethylacetamide (hereinafter, DMA for short), and N-alkyl(C1-3)-2-pyrrolidones (e.g. N-methyl-2-pyrrolidone)], ester solvents (e.g. ethyl acetate and butyl acetate), ether solvents (e.g. dioxane and THF), ketone solvents (e.g. cyclohexanone, methyl ethyl ketone, and methyl isobutyl ketone), aromatic hydrocarbon solvents (e.g. toluene and xylene) and sulfoxide solvents (e.g. dimethyl sulfoxide), and mixtures of two or more of these.

From the viewpoint of reactivity in polyurethane production and solubility of polyurethane resins, amide solvents are preferred, and DMA and DMF are more preferred.

The amount of the solvent is generally 3 to 10 times the weight of (A1) [or the total weight of (A1) and (A2)]. From the solution viscosity viewpoint, it is preferably 4 to 7 times on the same basis.

Employable as the additive (A32) are those generally used in polyurethane production. Thus, as (A32), there may be mentioned stabilizers (A321) [e.g. antioxidants (A3211), ultraviolet absorbers (A3212), hydrolysis inhibitors (A3213), and antibacterial/antifungal agents (A3214)]; filling/coloring agents (A322) [e.g. fillers (A3221) and colorants (A3222)], flame retardants/plasticizers/mold-releasing agents (A323) [e.g. flame retardants (A3231), plasticizers (A3232), and mold-releasing agents (A3233)], surfactants (A324) [e.g. antistatic agents (A3241), emulsifiers (A3242), and foam stabilizers (A3243)], dispersants (A325), catalysts (A326) and foaming agents (A327), and combinations of two or more of these.

As the antioxidants (A3211), there may be mentioned, for example, hindered phenols [e.g. 2,6-di-tert-butyl-p-cresol (BHT), and 2,2'-methylenebis(4-methyl-6-tert-butylphenol)], sulfur-containing ones [e.g. dilauryl 3,3'-thiodipropionate (DLTDP), and distearyl 3,3'-thiodipropionate (DSTDP)], phosphorus-containing ones [e.g. triphenyl phosphite (TPP) and triisodecyl phosphite (TDP)], and amine type ones [e.g. octyldiphenylamine and N-n-butyl-p-aminophenol, and N,N-diisopropyl-p-phenylenediamine].

As the ultraviolet absorbers (A3212), there may be mentioned, for example, benzophenones (e.g. 2-hydroxybenzophenone and 2,4-dihydroxybenzophenone), salicylates (e.g. phenyl salicylate and 2,4-di-tert-butylphenyl 3,5-di-tert-butyl-4-hydroxybenzoate), benzotriazoles [e.g. (2'-hydroxyphenyl)benzotriazole and (2'-hydroxy-5'-methylphenyl) benzotriazole], and acrylates [e.g. ethyl 2-cyano-3,3'-diphenylacrylate and methyl 2-carbomethoxy-3-(paramethoxybenzyl)acrylate].

As the hydrolysis inhibitors (A3213), there may be mentioned carbodiimides (Stabaxol 1, PCD, etc.), 4-tert-butylcatechol, azodicarbonamide, azodicarboxylic acid esters, and fatty acid amides.

As the antibacterial/antifungal agents (A3214), there may be mentioned, for example, benzoic acid, parahydroxybenzoic acid esters, sorbic acid, halogenated phenols (e.g. 2,4,6-tribromophenol sodium salt, 2,4,6-trichlorophenol sodium salt, parachlorometaxylenol, pentachlorophenol, and pentachlorophenol laurate), organoiodine compounds (e.g. 4-chlorophenyl 3-iodopropargyl formal, 5-chloro-2-methyl-4-isothiazolin-3-one, and 2-methyl-4-isothiazolin-3-one), nitriles (e.g. 2,4,5,6-tetrachloroisophthalonitrile), thiocyano compounds (e.g. methylenebisthiocyanate), N-haloalkylthioimides (e.g. N-tetrachloroethylthiotetrahydrophthalimide, N-trichloromethylthiophthalimide), copper-containing agents (e.g. 8-hydroxyquinoline copper salt), benzimidazoles (e.g. 2-4-thiazolylbenzimidazole), benzothiazoles (e.g. 2-thiocyanomethylthiobenzothiazole), trihaloallyl compounds (e.g. 3-bromo-2,3-diiodo-2-propenyl ethyl carbonate), triazoles (e.g. azaconazole) and organonitrogen/sulfur compounds (e.g. Slaoff 39).

As the fillers (A3221), there may be mentioned, for example, metal powders (e.g. aluminum powders and copper powders), metal oxides (e.g. alumina, wollastonite, silica, talc, mica, vermiculite, kaolin clay, calcined kaolin, and terra alba), metal hydroxides (e.g. aluminum hydroxide), metal sulfides (e.g. molybdenum disulfide), metal salts (e.g. calcium carbonate, calcium silicate, barium sulfate, and barite), fibers [e.g. inorganic fibers [e.g. carbon fibers, cellulose, α-cellulose, glass fibers, metal (e.g. aluminum) fibers, ceramic whiskers, titanium whiskers, and asbestos] and organic fibers (e.g. cotton, jute, nylon, acrylic and rayon fibers)], microballoons (e.g. glass, shirasu, and phenol resin balloons), carbon species (e.g. carbon black, graphite, and carbon nanotubes), organic powders (e.g. wood flour), and inorganic powders (e.g. coal dust).

As the colorants (A3222), there may be mentioned pigments, for example inorganic pigments [e.g. white pigments (e.g. titanium oxide, lithopone, white lead and zinc flower), cobalt compounds (e.g. aureolin, cobalt green, cerulean blue, cobalt blue, and cobalt violet), iron compounds (e.g. colcothar, and Prussian blue), chromium compounds (e.g. chromium oxide, chrome yellow, and barium chromate) and sulfides (e.g. cadmium sulfide, cadmium yellow and ultramarine blue)], and organic pigments [e.g. azo pigments (e.g. azo lake, monoazo, disazo and chelate azo pigments) and polycyclic pigments (e.g. benzimidazoline, phthalocyanine, quinacridone, dioxazine, isoindolinone, thioindigo, perylene, quinophthalone and anthraquinone pigments)]; and dyes, for example azo, anthraquinone, indigoid, sulfur, triphenylmethane, pyrazolone, stilbene, diphenylmethane, xanthene, alizarin, acridine, quinoneimine, thiazole, methine, nitro, nitroso and aniline dyes.

As the flame retardants (A3231), there may be mentioned, for example, organic ones [phosphorus-containing ones [e.g. phosphate esters (e.g. tricresyl phosphate, and tris(2,3-dibromopropyl) phosphate)], bromine-containing ones (e.g. tetrabromobisphenol A, and decabromobiphenyl ether) and chlorine-containing ones [e.g. chlorinated paraffin, and HET acid (anhydride)] and inorganic ones [e.g. antimony trioxide, boric acid salts (e.g. zinc borate and barium metaborate), aluminum hydroxide, red phosphorus, magnesium hydroxide, and ammonium polyphosphate].

As the plasticizers (A3232), there may be mentioned, for example, monocarboxylic acid esters [C10-30, for example fatty acid esters [e.g. butyl stearate (BS), methoxyethyl oleate (MEO), methyl acetylricinolate (MAR), ethyl acetylricinolate (EAR), methoxyethyl acetylricinolate (MEAR), and glycerol triheptanoate] and aromatic carboxylic acid esters [C18-30, for example diEG dibenzoate, and triEG dibenzoate]]; dicarboxylic acid esters [e.g. aromatic dicarboxylic acid esters [C10-40, e.g. phthalic acid esters [e.g. dimethyl phthalate (DMP), diethyl phthalate (DEP), dibutyl phthalate (DBP), heptyl nonyl phthalate (HNP), di-2-ethylhexyl phthalate (DOP), di-n-octyl phthalate (DNOP), di-isooctyl phthalate (DIOP), di-sec-octyl phthalate (DCapP), di(79 alkyl) phthalate (D79P), isodecyl phthalate (DIDP), ditridecyl phthalate (DTDP), dicyclohexyl phthalate (DCHP), butyl benzyl phthalate (BBP), ethyl phthalyl ethyl glycolate (EPEG), and butyl phthalyl butyl glycolate (BPBG)]] and aliphatic dicarboxylic acid esters [C10-40, e.g. adipic acid esters [e.g. di-2-ethylhexyl adipate (DOA), diisodecyl adipate (DIDA), and di(methylcyclohexyl) adipate], azelaic acid esters [e.g. di-n-hexyl azelate (DNHZ), and di-2-ethylhexyl azelate (DOZ)], and sebacic acid esters [e.g. dibutyl sebacate (DBS), and di-2-ethylhexyl sebacate (DOS)]]}; tricarboxylic acid esters {e.g. aliphatic tricarboxylic acid esters [C9-60, e.g. citric acid esters [e.g. triethyl citrate (TEC), tributyl citrate (TBC), triethyl acetylcitrate (ATEC), tributyl acetylcitrate (ATBC), tricyclohexyl acetylcitrate, trioctyl citrate, tri (octyldecyl) citrate]]); epoxides [C10-40, e.g. epoxidized soybean oil (ESO), and di-2-ethylhexyl 4,5-epoxycyclohexane-1,2-dicarboxylate (E-PS)]; phosphoric acid esters [C10-30, e.g. tributyl phosphate (TBP), triphenyl phosphate (TPP), tricresyl phosphate (TCP), diphenyl monocresyl phosphate, 2-ethylhexyl diphenyl phosphate, tripropylene glycol phosphate, tributoxyethyl phosphate, trichloroethyl phosphate, triethyl phosphate, and trixylyl phosphate]; chlorine-containing hydrocarbons [C10-30, e.g. aromatic hydrocarbons (e.g. chlorinated naphthalene and chlorinated diphenyl) and chlorinated paraffin] and petroleum resins.

As the mold-releasing agents (A3233), there may be mentioned, for example, liquid paraffin, hardened oils, waxes (e.g. carbauba wax, spermaceti, Purified insect wax, montan wax, beeswax), alcohols (C12-20, e.g. cetyl alcohol and stearyl alcohol), fatty acids (e.g. stearic acid), fatty acid esters (C16-36, e.g. butyl stearate, cetyl stearate, EG monostearate, and methyl hydroxystearate), fatty acid amides (C12-24, e.g. palmitamide, ricinolamide, stearamide, oleamide, and erucamide), and fatty acid metal salts (e.g. calcium stearate, lead stearate, and barium stearate).

As the antistatic agents (A3241), there may be mentioned surfactant type antistatic agents, for example those described in U.S. Pat. No. 4,331,447, namely cationic surfactants [e.g. alkyl (C8-20; hereinafter the same shall apply)trimethylammonium salts, dialkyldimethylammonium salts and alkyldimethylbenzylammonium salts], amphoteric surfactants [e.g. betaine type ones such as alkyldimethylbetaines, and alanine type ones such as N-alkyl-β-aminopropionic acid salts], anionic surfactants [e.g. sulfuric acid ester salts such as alkyl sulfate salts and polyoxyalkylene (C2-4; hereinafter the same shall apply) alkyl ether sulfate salts; phosphoric acid ester salts such as alkyl phosphate salts and polyoxyalkylene alkyl ether phosphate salts;

sulfonic acid salt type ones such as dialkyl sulfosuccinate salts and alkylbenzenesulfonic acid salts; and carboxylic acid salt type ones such as alkyl(polyoxyalkylene) ether carboxylic acid salts and soaps]; and nonionic surfactants [e.g. polyoxyethylene type ones such as polyoxyethylene alkyl ethers, and polyhydric alcohol type ones such as fatty acid (C8-20) esters of polyhydric alcohols [those described as initiators for (A211): sorbitan etc.], and alkylolamide type ones such as fatty acid (C8-20) mono- and diethanolamides]; and polymeric antistatic agents (Mn 5,000 to 50,000) [e.g. polyetheresteramides (such as those described in U.S. Pat. No. 5,652, 326)].

The surfactants as the emulsifiers (A3242) include those enumerated below as well as the nonionic, cationic, anionic and amphoteric surfactants described in U.S. Pat. Nos. 3,929, 678 and 4,331,447.

1) Nonionic surfactants:
AO adduct type nonionics, for example (poly)oxyalkylene derivatives of active hydrogen atom-containing compounds having a hydrophobic group (C8-24 or higher) [saturated and unsaturated higher alcohols (C8-18), higher aliphatic amines (C8-24), higher fatty acids (C8-24), etc.: e.g. alkyl or alkenyl (e.g. dodecyl, stearyl, oleyl) alcohols and amines, and alkanoic or alkenoic acids (e.g. lauric, stearic, oleic acid)] [AO (C2-4, e.g. EO, PO, butylene oxide and combinations of two or more of these, in particular EO) (1 to 500 moles or more) adducts (molecular weight 174 to Mn 30,000), and higher fatty acid mono- and diesters of polyalkylene glycols (e.g. PEG; molecular weight 150 to Mn 6,000)]; (poly)oxyalkylene derivatives (as mentioned above; molecular weight 320 to Mn 30,000; e.g. Tween type nonionics) of polyhydric alcohol (dihydric to octahydric or further polyhydric, e.g. ethylene glycol, glycerol, trimethylolpropane, pentaerythritol, sorbitan, sucrose) higher fatty acid (as mentioned above) esters; (poly)oxyalkylene derivatives (as mentioned above; molecular-weight 330 to Mn 30,000) of higher fatty acid (as mentioned above) (alkanol)amides; polyhydric alcohol (as mentioned above) alkyl (C3-60) ether(poly)oxyalkylene derivatives (as mentioned above; molecular weight 180 to Mn 30,000); and polyoxypropylene polyol [polyhydric alcohol (as mentioned above) or polyamine [mentioned above as initiator for (A211)] polyoxypropylene derivative (e.g. PPG- and ethylenediamine-PO adducts; Mn 500 to 5,000)]-based polyoxyethylene derivatives (Mn 1,000 to 30,000) [Pluronic type and Tetronic type nonionics]; Polyhydric alcohol (C3-60) type nonionics, for example polyhydric alcohol (as mentioned above) fatty acid (C8-20) esters, polyhydric alcohol (as mentioned above) alkyl (C3-60) ethers, and fatty acid (as mentioned above) alkanolamides; and Amine oxide type nonionics, for example (hydroxyl)alkyl (C10-18: e.g. dodecyl, stearyl, oleyl, 2-hydroxydodecyl)di(hydroxyl)alkyl (C1-3: e.g. methyl, ethyl, 2-hydroxyethyl)amine oxides.

2) Cationic surfactants:
Quaternary ammonium salt type cationics, for example tetraalkylammonium salts (C11-100), e.g. alkyl (C8-18: e.g. lauryl, stearyl)trimethylammonium salts and dialkyl (C8-18: e.g. decyl, octyl)dimethylammonium salts; trialkylbenzylammonium salts (C17-80), e.g. lauryldimethylbenzylammonium salts; alkyl (C8-60) pyridinium salts, e.g. cetylpyridinium salts; (poly)oxyalkylene (C2-4, degree of polymerization 1 to 100 or higher)trialkylammonium salts (C12-100), e.g. polyoxyethylenelauryldimethylammonium salts; and acyl (C8-18) aminoalkyl (C2-4)- or acyl (C8-18) oxyalkyl (C2-4) tri[(hydroxyl)alkyl (C1-4)]ammonium salts, e.g. stearamidoethyldiethylmethylammonium salts (Sapamine type quaternary ammonium salts) [these salts include, for example, halides (e.g. chloride, bromide), alkyl sulfates (e.g. methosulfate) and organic acid (as mentioned below) salts]; and Amine salt type cationics: inorganic acid (e.g. hydrochloric, sulfuric, nitric or phosphoric acid) salts and organic acid (C2-22: e.g. acetic, propionic, lauric, oleic, succinic, adipic, azelaic or benzoic acid) salts of primary to tertiary amines [e.g. polyoxyalkylene derivatives (as mentioned above; EO adducts etc.) of higher aliphatic amines (C12-60; lauryl, stearyl and cetylamine, hydrogenated tallow amines, rosin amines, etc.) or aliphatic amines (C8-20), and acylaminoalkyl- or acyl (C8-18) oxyalkyldi(hydroxyl)alkyl (as mentioned above) amines (e.g. stearoyloxyethyldihydroxyethylamine, stearamidoethyldiethylamine)].

3) Anionic surfactants:
Carboxylic acids (salts), for example higher fatty acids (as mentioned above), ether carboxylic acids [products of carboxymethylation of higher alcohols (as mentioned above) or AO adducts thereof, e.g. EO (1 to 10 moles) adducts], and salts thereof; sulfuric acid ester salts, for example sulfuric acid ester salts of the above-mentioned higher alcohols or AO adducts thereof (alkyl and alkyl ether sulfates), sulfated oils (salts obtained by neutralization of natural unsaturated oils or unsaturated waxes sulfated as such), sulfated fatty acid esters (salts obtained by neutralization of sulfated unsaturated fatty acid lower alcohol esters) and sulfated olefins (salts obtained by neutralization of sulfated C12-18 olefins); sulfonic acid salts, for example alkylbenzenesulfonic acid salts, alkylnaphthalenesulfonic acid salts, sulfosuccinic acid dialkyl ester type ones, α-olefin (C12-18) sulfonic acid salts and N-acyl-N-methyltaurines (e.g. Igepon T type); and phosphoric acid ester salts, for example phosphoric acid ester salts derived from the above-mentioned higher alcohols or AO adducts thereof [e.g. EO (1 to 10 moles) adducts] or alkyl (C4-60) phenol-AO adducts (as mentioned above) (alkyl, alkyl ether and alkylphenyl ether phosphates).

4) Amphoteric surfactants:
Carboxylic acid (salt) type amphoterics, for example amino acid type amphoterics, e.g. alkyl (C8-18) aminopropionic acids (salts), and betaine type amphoterics, e.g. alkyl (as mentioned above) di(hydroxyl)alkyl (as mentioned above) betaines (alkyldimethylbetaines, alkyldihydroxyethylbetaines, etc.); sulfuric acid ester (salt) type amphoterics, e.g. alkyl (as mentioned above)amine sulfate esters (salts), and hydroxyalkyl (C2-4: e.g. hydroxyethyl)imidazoline sulfate esters (salts); sulfonic acid (salt) type amphoterics, e.g. alkyl (as mentioned above: e.g. pentadecyl)sulfotaurines, and imidazolinesulfonic acid (salts); and phosphoric acid ester (salt) type amphoterics, e.g. glycerol higher fatty acid (as mentioned above) ester phosphate esters (salts).

The salt moieties of the above-mentioned anionic and amphoteric surfactants include metal salts, for example alkali metal (e.g. lithium, sodium, potassium), alkaline earth metal (e.g. calcium, magnesium) and group IIB metal (e.g. zinc) salts; ammonium salts; amine salts and quaternary ammonium salts.

The salt-forming amines include C1-20 amines, for example hydroxylamines [C2-10, e.g. (di)alkanolamines (e.g. 2-aminoethanol, diethanolamine), cycloalkanolamines (e.g. 3-aminomethyl-3,5,5-trimethylcyclohexanol) and alkylalkanolamines (e.g. methylethanolamine, ethylethanolamine)], tertiary amino group-containing diols and primary monoamines, secondary monoamines (e.g. dialkylamines, morpholine), and alkylation (C1-4) products and/or hydroxyalkylation (C2-4) products (AO adducts) derived therefrom: for example mono-, di- and tri(hydroxyl)alkyl(amines) (mono-, di- and triethanolamine, ethylamine, diethylethanolamine, morpholine, N-methylmorpholine, N-hydroxyethylmorpholine, etc.). The quaternary ammonium salts include quaternization products derived from these amines [products of quaternization with those quaternizing agents described in U.S. Pat. No. 4,271,217 or dialkyl carbonates (C1-4 alkyl group-containing carbonates, e.g. dimethyl, diethyl and diisopropyl carbonate)].

The foam stabilizers (A3243) include silicone surfactants, for example polyoxyethylene-modified polydimethylsiloxanes.

The dispersants (A325) include the following: Water-soluble polymers (Mn: 1,000 to 100,000 or higher, preferably 3,000 to 10,000; solubility in water: at least 1 g/100 g, preferably at least 10 g/100 g): nonionic water-soluble polymers, for example polyvinyl alcohol, polyacrylamide and polyethylene oxide; and anionic water-soluble polymers, for example naphthalenesulfonic acid-formalin condensates (Mn 1,000 to 10,000); polymers of sulfo group-containing monomers [unsaturated sulfonic acids, e.g. alkenesulfonic acids (e.g. vinylsulfonic acid), unsaturated aromatic sulfonic acids (e.g. styrenesulfonic acid), sulfo carboxylic acid (e.g. sulfosuccinic acid) alkenyl and alkyl(C1-18) alkenyl esters (e.g. methyl vinyl sulfosuccinate), sulfo(hydroxyl)alkyl (meth)acrylates and the corresponding (meth)acrylamides [e.g. sulfoethyl(meth)acrylate, 2-(meth)acrylamido-2-methylpropanesulfonic acid)] or/and carboxyl group-containing monomers [unsaturated mono- and dicarboxylic acids, and anhydrides thereof, e.g. (meth)acrylic, (iso)crotonic, cinnamic, (anhydro)maleic, fumaric and (anhydro)itaconic acid; dicarboxylic acid monoesters; monoalkyl (C1-8 or higher) esters of the above-mentioned dicarboxylic acids, e.g. monoalkyl esters of maleic, fumaric, itaconic and citraconic acid; and salts of these, e.g. alkali metal salts, alkaline earth metal salts, ammonium salts, amine (C2-24) salts and quaternary ammonium (C4-24) salts] or copolymers of these monomers with one or more other monomers, for example polystyrenesulfonic acid salts (Mn 1,000 to 100,000), poly(meth)acrylic acid salts (Mn 2,000 to 50,000), (meth)acrylic acid (salt)/alkyl(meth)acrylate copolymers and maleic acid (salt)/vinyl acetate copolymers; and cellulose derivatives, for example carboxymethylcellulose. The salt moieties of the anionic polymers include the same ones [e.g. alkali metal (e.g. sodium, potassium) salts] as mentioned above referring to the anionic and amphoteric surfactants.

The catalysts (A326) include metal catalysts, for example tin-based catalysts (e.g. trimethyltin laurate, trimethyltin hydroxide, dimethyltin dilaurate, dibutyltin dilaurate, stannous octoate), lead-based catalysts (e.g. lead oleate, lead 2-ethylhexanoate, lead naphthenate, lead octenoate); amine catalysts, for example aliphatic tertiary amines [e.g. trihydrocarbylamines(triethylamine, dimethylcyclohexylamine), tetrahydrocarbylalkylenediamine (e.g. tetramethylethylenediamine), and pentahydrocarbyldiethylenetriamine (e.g. pentamethyldiethylenetriamine)], and heterocyclic amines [e.g. N-methylmorpholine, triethylenediamine, and cycloamidine compounds described in U.S. Pat. No. 4,524,104, for example 1,8-diazabicyclo[5.4.0]undecene-7 [DBU (registered trademark), product of San-Apro Ltd.]]; and combinations of two or more of these.

The foaming agents (A327) include water, physical foaming agents [volatile (low-boiling) liquids], for example alternatives to chlorofluorocarbons [hydrochlorofluorocarbons (HCFCs), e.g. R123, R22, R124; hydrofluorocarbons (HFCs), e.g. R134a, R125, R32, R152a], and combinations of both.

The addition levels of (A32) can be selected according to the purpose of addition and the performance requirements. Generally, however, such levels as given below based on the weight of (A1) [or the sum of (A1) and (A2)]:

Stabilizers (A321) in total Not higher than 10%, preferably 0.05 to 5%

Antioxidants (A3211) Not higher than 5%, preferably 0.05 to 1%

UV absorbers (A3212) Not higher than 5%, preferably 0.05 to 1%

Hydrolysis inhibitors (A3213) Not higher than 5%, preferably 0.05 to 1%

Antimicrobial/antifungal agents (A3214) Not higher than 10%, preferably 0.01 to 5%

Fillers/colorants (A322) in total Not higher than 80%, preferably 5 to 70%

Fillers (A3221) Not higher than 80%, preferably 5 to 70%

Colorants (A3222) Not higher than 5%, preferably 0.1 to 3%

Flame retardants/plasticizers/mold-release agents (A323) in total Not higher than 30%, preferably 5 to 25%

Flame retardants (A3231) Not higher than 30%, preferably 5 to 25%

Plasticizers (A3232) Not higher than 30%, preferably 5 to 20%

Mold-release agents (A3233) Not higher than 5%, preferably 0.1 to 2%

Surfactants (A324) in total Not higher than 5%, preferably 0.1 to 3%

Antistatic agents (A3241) Not higher than 5%, preferably 0.1 to 3%

Emulsifiers (A3242) Not higher than 5%, preferably 0.1 to 3%

Foam stabilizers (A3243) Not higher than 5%, preferably 0.1 to 3%

Dispersants (A325) Not higher than 5%, preferably 0.1 to 3%

Catalysts (A326) Not higher than 5%, preferably 0.1 to 3%

The foaming agents (A327) are used in an amount sufficient to give foamed polyurethane resins having a specified density (to be mentioned later herein).

The compositions of the invention include a composition comprising at least 15 mole % (preferably at least 20 mole %, still more preferably at least 30 mole %, most preferably at least 40 mole %) of the anionic diol (A1) and not more than 85 mole % (preferably at least 0.1 mole %, more preferably at least 10 mole %, still more preferably at least 20 mole %, most preferably at least 30 mole %) of the other active hydrogen atom-containing compound (A2); and a composition comprising (A1) [or (A1) and the above mole proportion of (A2)] and the compounding ingredient (A3).

In the latter composition, the content of (A1) [or the sum of (A1) and (A2)] is preferably 10 to 90%, more preferably 20 to 80%, the content of the inert solvent (A31) is preferably 10 to 90%, more preferably 20 to 80%, the content of the additive(s) (A32) is preferably 0.1 to 30%, more preferably 3 to 20%, and the total content of (A3) is preferably 10 to 90%, more preferably 20 to 80%. The composition of the invention preferably has a viscosity (25° C.) of 100 to 50,000 mPa·s, more preferably 500 to 30,000 mPa·s.

Either the method of forming the composition of the invention or the order of addition of (A3) is not particularly restricted. (A3) or part thereof may be mixed with (A1) [or (A1) and (A2)] in advance, or (A3) and (A1) [or (A1) and (A2)] may be mixed together in the step of polyurethane resin formation [mixing with the polyisocyanate component (B)] to thereby form a composition and at the same time cause polyurethane resin formation.

The polyol component and composition of the invention are used for the manufacture of unfoamed or foamed, anionic group-containing polyurethane resins by reacting with the polyisocyanate component (B).

The component (B) comprises an organic polyisocyanate (B1) and/or an isocyanato group-terminated urethane prepolymer (B2).

Employable as (B1) and (B2) are those conventionally used in polyurethane manufacture. Generally, (B1) and (B2) have 2 to 5 or more (preferably 2 or 3, more preferably 2) isocyanato groups (NCO groups).

As (B1), there may be mentioned C2-18 (exclusive of NCO carbon atoms; hereinafter the same shall apply) aliphatic polyisocyanates, C4-15 alicyclic polyisocyanates, C8-15 araliphatic polyisocyanates, C6-20 aromatic polyisocyanates, and modification of these polyisocyanates (e.g. carbodiimide group-, urethane group-, urea group-, isocyanurate group-, uretimine group-, alophanate group-, biuret group-, oxazolidone group- and/or uretodione group-containing modifications) as well as mixtures of two or more of these. As typical examples of these, there may be mentioned the following.

Aliphatic polyisocyanates: diisocyanates, e.g. ethylene diisocyanate, tetramethylene diisocyanate, hexamethylene diisocyanate (HDI), dodecamethylene diisocyanate, 2,2,4- and/or 2,4,4-trimethylhexamethylene diisocyanate, lysine diisocyanate, 2,6-diisocyanatoethyl caproate, bis(2-isocyanatoethyl)fumarate and bis(2-isocyanatoethyl)carbonate; and trifunctional and further polyfunctional polyisocyanates (e.g. triisocyanates), e.g. 1,6,11-undecanetriisocyanate, 1,8-diisocyanato-4-isocyanatomethyloctane, 1,3,6-hexamethylenetriisocyanate, lysine ester triisocyanate (phosgenated lysine-alkanolamine reaction product), 2-isocyanatoethyl-2,6-diisocyanatohexanoate, and 2- and/or 3-isocyanatopropyl 2,6-diisocyanatohexanoate;

alicyclic polyisocyanates: diisocyanates, e.g. isophoronediisocyanate (IPDI), dicyclohexylmethane-4,4'-diisocyanate (hydrogenated MDI), cyclohexylene diisocyanate, methylcyclohexylene diisocyanate, bis(2-isocyanatoethyl)-4-cyclohexylene-1,2-dicarboxylate and 2,5- and/or 2,6-norbornanediisocyanate; and trifunctional or further polyfunctional polyisocyanates (e.g. triisocyanates), e.g. bicycloheptanetriisocyanate;

araliphatic polyisocyanates: m- and/or p-xylylene diisocyanate (XDI), diethylbenzene diisocyanate and α,α,α',α'-tetramethylxylylene diisocyanate (TMXDI);

aromatic polyisocyanates: diisocyanates, e.g. 1,3- and/or 1,4-phenylene diisocyanate, 2,4- and/or 2,6-tolylene diisocyanate (TDI), 4,4'- and/or 2,4'-diphenylmethanediisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane and 1,5-naphthylene diisocyanate; and trifunctional and further polyfunctional polyisocyanates (e.g. triisocyanates), for example crude TDI and crude MDI (polymethylenepolyphenylene polyisocyanate); and polyisocyanate modifications: e.g. modifications of hydrogenated MDI (carbodiimide-modified hydrogenated MDI, and trihydrocarbyl phosphate-modified hydrogenated MDI), biuret modification of HDI, isocyanurate modification of HDI and isocyanurate modification of IPDI.

(B2) is derived from a polyol (B3) and an excess of the above-mentioned (B1).

The polyol (B3) to be used for the production of (B2) is generally a high-molecular-weight polyol (B31) and, where necessary, a low-molecular-weight polyol (B32) is used.

Here, (B31) and (B32) include the same ones as the above-mentioned high-molecular-weight polyols (A21) and low-molecular-weight polyols (A22), respectively. (B2) can be produced by reacting (B1) and (B3) [(B31) and/or (B32)] in the manner of urethane formation by the one-stage process or the multistage process [comprising subjecting part of (B3), e.g. (B31), to reaction and then subjecting the remainder of (B3), e.g. (B32), to reaction].

The equivalent ratio between (B1) and (B3) (NCO/OH ratio) in the production of (B2) is generally 1.1 to 10, preferably 1.4 to 4, more preferably 1.4 to 2. Further, (B31) is preferably used in an amount of 0.1 to 0.5 equivalent, in particular 0.2 to 0.4 equivalent, and (B32) in an amount of 0 or 0.01 to 0.2 equivalent, in particular 0.05 to 0.15 equivalent, per equivalent of (B1).

From the viewpoint of good polyurethane resin physical properties (e.g. tensile elongation), (B2) generally has an isocyanato group equivalent (hereinafter referred to as "NCO equivalent" for short) of 150 to 5,000, preferably 200 to 4,000, more preferably 300 to 3,000, most preferably 350 to 2,000.

Among the (B3) species, (B31) and a combination of (B31) and (B32) are preferred [so that the NCO equivalent (mean) as a whole may fall within the above range].

The methods of producing a polyurethane resin (U) by reacting the polyol component or composition of the invention with the polyisocyanate component (B) include the one-stage method (one-shot process) and the two-stage method (prepolymer process). As the latter, there may be mentioned the semiprepolymer method and complete prepolymer method.

The one-stage methods include the method comprising reacting a component or composition comprising (A1) or (A1) and (A2) and/or (A3) with (B) simultaneously to give an anionic group-containing polyurethane resin, and the method comprising mixing (A1) and (A2) and/or (A3) with (B) simultaneously to form the composition comprising (A1) and (A2) and/or (A3) and at the same time producing an anionic group-containing polyurethane resin. In both of these methods, part or the whole of (A3) except for water may be contained in (B) in advance. For example, mention may be made of the method comprising reacting (B) containing (A3) with the polyol component comprising (A1) or (A1) and (A2), and the method comprising reacting (B) containing part of (A3) with a composition comprising (A1) [or (A1) and (A2)] and the remainder of (A3).

The prepolymer processes include 1) the process taking place via an isocyanato-terminated prepolymer and 2) the process taking place via a hydroxyl-terminated prepolymer.

The processes 1) include the technique comprising using (A1) as at least part of (B3) and/or as part of a curing component in producing a polyurethane resin by reacting an isocyanato-terminated prepolymer (semiprepolymer or complete prepolymer) resulting from reaction of such a polyol (B3) as mentioned above [(B31) and/or (B32), preferably (B31) and the combined use thereof with (B32) (weight ratio 99/1 to 50/50)] with (B1) in an excess equivalent (NCO/OH ratio as mentioned above) with a curing component comprising an active H compound.

To be used as the above curing component is the active H compound (A2), preferably a low-molecular-weight polyfunctional active H compound (chain extender and/or crosslinking agent) or a combination of this with a reaction terminator. The low-molecular-weight polyfunctional active H compounds include water, (A22) and (A2312) as well as combinations of these. Employable as the reaction terminator is (A232) and/or (A233).

The above-mentioned reaction between prepolymer and curing component may be carried out by introducing the prepolymer into an aqueous medium (for water extension) or into an aqueous medium containing (A22) and/or (A2312) (for polyol extension and/or polyamine extension). The aqueous mediums include water and aqueous solutions containing (A31) and/or ((A3242) and/or (A325)].

The reaction terminator may be contained in the curing component [(A22) and/or (A2312)]. Alternatively, the reaction may be terminated by addition of the terminator after reaction of the prepolymer with the curing agent (for chain extension) (at the stage of arrival at a predetermined molecular weight or viscosity).

In the above process, it is also possible to produce a polyurethane resin by using (A2312) in a blocked form (in a ketimine-blocked or aldimine-blocked form), preparing a composition comprising this and a prepolymer [formed from (A1)] and, after application to a substrate, heating the composition for free amino group regeneration and reaction with the prepolymer.

The processes 2) include the technique comprising, in producing a polyurethane resin by reacting a polyol component (A) comprising a hydroxyl-terminated prepolymer resulting from reaction of (B1) with a polyol (A0) in an excess equivalent (OH/NCO ratio 1.1 to 10, preferably 1.4 to 4, more preferably 1.4 to 2) with the component (B) [(B1) and/or (B2)], using (A1) as at least part of the polyol (A0) to be used in prepolymer production, as part of (A) to be added to the prepolymer and/or as at least part of the polyol (B3) to be used in producing (B2).

In the above process, it is also possible to produce a polyurethane resin by using, as the component (B), a blocked one (blocked form), preparing a composition comprising this and the polyol component (A) and, after application to a substrate, heating the composition for free isocyanato group regeneration and reaction with the component (A). Usable as the blocking agent for blocked form formation is at least one species selected from the group consisting of phenols, active methylene compounds (C—H acid compounds), lactams, oximes, sulfite salts, tertiary alcohols, secondary aromatic amines, imides and mercaptans, as described in U.S. Pat. No. 4,524,104.

In these processes, (A3) can be incorporated at an arbitrary stage. For example, part or the whole of (A3) may be added before prepolymer production [to the polyol (B3) or (A0), and/or the polyisocyanate (B1)], or may be admixed simultaneously in the production, or may be added to the prepolymer after production thereof, or may be added to the curing component in 1), or may be added on the occasion of mixing of (A) with (B). Part or the whole of (A3) other than water may be contained in advance in (B).

In producing the polyurethane resin (U), the NCO/active hydrogen atom-containing group equivalent ratio in the urethane formation reaction between the polyol component (A) and the isocyanate component (B) is generally 0.6/1 to 1.5/1, preferably 0.8/1 to 1.2/1. The isocyanate may also be used in large excess (generally, the equivalent ratio is 1.5/1 to 50/1 or higher, for example) to form a polyisocyanurate resin.

The above urethane formation reaction may be carried out without using any solvent or may be carried out in a solvent inert to the isocyanato group. Employable as the solvent are the same ones as mentioned above referring to (A31).

The urethane formation reaction temperature is generally 30 to 180° C., preferably 60 to 120° C. In carrying out the reaction, a catalyst used in conventional urethane formation reactions may be used. One or more of the above-mentioned (A326) species can be used as the catalyst.

The Mn of the polyurethane resin (U) may vary according to the intended use of the resin and the type thereof (thermoplastic or thermosetting). From the viewpoint of resin physical properties and durability, an Mn of at least 10,000, in particular at least 30,000, is generally preferred. In the case of a thermoplastic (linear, solvent-soluble) polyurethane resin, the resin preferably has an Mn of not higher than 200,000, more preferably not higher than 100,000. In the case of a thermosetting (three-dimensionally structured, solvent-insoluble) polyurethane resin, the resin has an Mn higher than the range mentioned above.

Preferably, (U) has a protonic acid (salt) group content of 0.01 to 7 millimoles/g, more preferably 0.1 to 5 millimoles/g.

The soft segment content [total content of (A1) having an OH equivalent of at least 250, high-molecular-weight polyols (A21) and (B31) and high-molecular-weight polyamine (A2311) based on total weight of (A1), (A2) and (B)] of (U) is preferably 30 to 90%, in particular 50 to 80%.

The polyurethane resin (U) obtained in accordance with the present invention can be used singly as a resin having functions owing to its hydrophilicity (e.g. antistatic properties, hydrophilicity, moisture-absorbing properties, moisture-absorbing/releasing properties and fog resistance) or as a resin having functions owing to its protonic acid (salt) groups (e.g. deyability). Further, that resin can be used also as a modifier for thermoplastic resin-based coating compositions (e.g. for providing antistatic properties and/or hydrophilicity).

As the thermoplastic resin, there may be mentioned, for example, polyester resins, polyamide resins, polyacrylic resins, polystyrene resins, polyvinyl chloride resins, polyurethane resins, ABS resins, polyolefin resins, polycarbonate resins and cellulose derivatives.

When (U) is used as a modifier for a thermoplastic resin, it is used generally at an addition level of 3 to 80%, preferably 20 to 60%, based on the weight of the thermoplastic resin.

As the method of admixing (U) as a modifier with a thermoplastic resin and molding the mixture, there may generally be mentioned the method comprising uniformly compounding (U) into the thermoplastic resin in pellet or powder form, if necessary, together with another additive or other additives (such as mentioned above), to a predetermined concentration in a mixer (e.g. Henschel mixer, tumbler, Banbury mixer), then heating, melting and kneading the mixture in an extruder, and molding the thus-obtained uniform mixture in the conventional manner (injection molding, blow molding, inflation molding, extrusion molding, pressure molding, casting, etc.) using a pressure molding machine, an injection molding machine or the like into films, sheets, and the like; the method comprising preparing in advance the so-called master batch by compounding (U), to a high concentration, into a small amount of the thermoplastic resin, then diluting the master batch to a predetermined concentration with the (U)-free thermoplastic resin and molding the resulting mixture in the same manner as mentioned above (master batch method); and the like methods. From the workability viewpoint, the latter master batch method is preferred.

Further, the polyurethane resin (U) obtained according to the invention can also be used for preparing a paint composition (e.g. dew condensation-preventing paint composition). The paint composition is obtained by compounding together the polyurethane resin of the invention, a pigment, an inorganic filler, a paint-thinning solvent and another resin, and the like. The content of (U) in such paint composition is at least 10%, preferably 20 to 80%, based on the total weight of the paint composition.

As the pigment, there may be mentioned inorganic pigments [e.g. titanium oxide, carbon black, colcothar, oxide yellow and those enumerated above referring to (A3222)] and organic pigments [e.g. phthalocyanine blue, phthalocyanine green and those enumerated above referring to (A3222)].

As the inorganic filler, there may be mentioned the same ones as mentioned above as inorganic fillers referring to (A3221).

As the paint-thinning solvent, there may be mentioned toluene, xylene, methyl ethyl ketone, cyclohexanone, methanol, water, and the like.

As the other resin, there may be mentioned those enumerated hereinabove as thermoplastic resins and, further, phenol resins, ketone resins, synthetic rubbers (styrene-butadiene rubbers, isoprene rubbers, etc.), unsaturated polyester resins, epoxy resins, melamine resins, urea resins, and natural resins such as rosin resins.

The level of addition of the above pigment or the like is generally not higher than 5%, preferably 0.1 to 3%, based on the total weight of the paint composition; that of the inorganic filler is generally not higher than 30%, preferably 5 to 20%; that of the paint-thinning solvent is generally not higher than 90%, preferably 20 to 70%: and that of the other resin is generally not higher than 90%, preferably 20 to 70%.

In the paint composition mentioned above, there may further be combinedly incorporated, if necessary, one or more of various auxiliaries such as leveling agents, antisagging agents, antifoaming agents, surfactants, curing promoters, antirepelling agents, pigment dispersants and antistatic agents.

As the leveling agents, there may be mentioned, for example, fluorine-containing surfactants, modified silicone resins, fluorinated polyolefins, polyvinyl butyral and polyacrylates.

As the antisagging agents, there may be mentioned inorganic ones (e.g. synthetic finely divided silica, bentonite and very finely divided surface-treated calcium carbonate) and organic ones [e.g. hydrogenated castor oil wax, metal soaps (calcium stearate, aluminum stearate, etc.), dibenzylidenesorbitol and vegetable oil-derived polymerized oils].

As the antifoaming agents, there may be mentioned low-molecular-weight ones [e.g. lower alcohols (C1-6, e.g. methanol, ethanol and butanol), higher alcohols (C8-18, e.g. octyl alcohol and hexadecyl alcohol), fats and oils, fatty acids (C8-20, e.g. oleic acid and stearic acid), fatty acid esters (C10-30, e.g. glycerol monolaurate), phosphoric acid esters (e.g. tributyl phosphate) and mineral oils] and polymeric ones [e.g. polyethers (e.g. polyalkylene glycol derivatives) and silicones (e.g. dimethylsilicone oils, organic-modified silicone oils, fluorosilicone oils and silica-silicone oil compounds)].

As the curing promoters, there may be mentioned the same ones as the catalysts enumerated hereinabove as (A326).

As the antirepelling agents, there may be mentioned, for example, silicone resins, acrylic oligomers [e.g. (meth)acrylic acid oligomers and (meth)acrylic acid/(meth)acrylic acid ester cooligomers], polycarboxylic acid salts and non-silicone surfactants.

As the pigment dispersants, there may be mentioned high-molecular-weight type ones [e.g. ones for aqueous systems (e.g. naphthalenesulfonic acid salt-formalin condensates, polystyrenesulfonic acid salts, polyacrylic acid salts, vinyl compound-carboxylic acid monomer copolymer salts, carboxymethylcellulose and polyvinyl alcohol) and ones for nonaqueous systems [e.g. polyacrylic acid partial alkyl esters and polyalkylenepolyamines], low-molecular-weight type ones (e.g. the surfactants mentioned above) and inorganic type ones (e.g. polyphosphoric acid salts).

As the antistatic agents, there may be mentioned the same ones as enumerated hereinabove as (A3241).

As for the levels of addition of the above various auxiliaries based on the total weight of the paint composition, the leveling agents, antisagging agents, antifoaming agents, antirepelling agents and pigment dispersants are each used generally at a level of not higher than 10%, preferably 1 to 7%; the curing promoters generally at a level of not higher than 1%, preferably 0.01 to 0.5%; and the antistatic agents generally at a level of not higher than 5%, preferably 0.1 to 3%.

The coating composition in which the polyurethane resin (U) of the invention is used can be produced in the conventional manner. For example, the above-mentioned components and ingredients are mixed up using a conventional mixing apparatus (e.g. Disper mixer, three-roll mill, ball mill, steel mill, pebble mill, attritor, sand mill, sand grinder, roll mill, pot mill, rotor blade-equipped high-speed mixer) to give a paint.

As the fields of application of the thermoplastic resin provided with hydrophilicity and other properties by the polyurethane resin (U) of the invention, there may be mentioned raw industrial materials (various pipes, sheets, films, square bars, bars, etc.), industrial materials [cases, pallets, trays, bottle stockers, house construction materials (wall materials, roofing materials, flooring materials, etc.), etc.], fibers and textiles (yarns, tows, tops, skeins, knit and woven fabrics, nonwoven fabrics, etc.), household articles (buckets, brooms, garbage cans, etc.), housings of household electric appliances (vacuum cleaner housings, television housings, copier housings, etc.), automotive parts and members (bumpers, inside panels, door trims, etc.), and the like.

As the fields of application of the paint composition provided with hydrophilicity and other properties by the polyurethane resin (U) of the invention, there may be mentioned antichipping paint compositions for automobiles, electric wire coating compositions, paint compositions for precoated metals, and the like.

Among the above-mentioned applications, the fibers and textiles are described below.

When the polyurethane resin (U) is spun either singly or in a form contained in another fiber-forming polymer, moisture-absorbing/releasing and/or dyeable fibers excellent in moisture-absorbing/releasing properties and/or in dyeability and also excellent in fiber characteristics can be obtained.

As for the proportion (mixing ratio) of (U) to be contained in another fiber-forming polymer, a lower limit thereto preferred from the moisture-absorbing/releasing properties and/or dyeability viewpoint is 3%, more preferably 7%, relative to the total polymer weight, and a preferred upper limit from the viewpoint of spinnability and fiber physical characteristics is 40%, more preferably 30%.

As the other fiber-forming polymer, there may be mentioned, for example, polyolefins (polyethylene, polypropylene, etc.), polyamides (6-nylon, 6,6-nylon, etc.), polyesters (polyethylene terephthalate, polybutylene terephthalate, etc.), and the like.

As the fiber form, there may be mentioned single-component fibers made of (U), and composite fibers made of (U) and the other fiber-forming polymer mentioned above used in arbitrary proportions [core-sheath type composite fibers, core-sheath type composite hollow fibers, covering yarns [finished yarns in a form such that a covering yarn covering (U) in the central portion thereof, for example single covered yarns (SCY), double covered yarns (DCY), etc.], sea-island type composite fibers, laminate type composite fibers, etc.].

As regards the combining ratio (ratio by weight), the combining ratio between the core-forming (U) and the sheath-forming other fiber-forming polymer in the case of core-sheath type composite fibers, core-sheath type hollow composite fibers and covering fibers, for example, is preferably core/sheath=3/97 to 40/60, more preferably 7/93 to 30/70. The combining ratio can be arbitrarily selected according to whether the fibers are to be dyed or not. The lower limit to the combining proportion of the core portion is to be defined from the viewpoint of moisture-absorbing/releasing properties and/or giving dyeability, and the upper limit thereto is defined from the viewpoint of spinnability and fiber physical properties.

In the case of sea-island type composite fibers or laminate type composite fibers as well, the combining ratio between the island-forming (U) and the sea portion-forming other fiber-forming polymer is preferably 3/97 to 40/60, more preferably 7/93 to 30/70. The lower limit to the combining proportion of the island portion is to be defined from the viewpoint of moisture-absorbing/releasing properties and/or giving dyeability, and the upper limit thereto is defined from the viewpoint of spirinability and fiber physical properties.

The single-component fibers made of (U) or the composite fibers made of (U) and another fiber-forming polymer can be produced by any of the methods known in the art. In the following, the case of core-sheath type composite fibers, which is taken as a representative example, is described.

A polyester (sheath portion) and (U) (core portion) are melted separately, and the melts are introduced to a spinning pack, where core-sheath composite flows are formed in the spinneret and discharged from hole openings.

The filament yarn thus spun are taken off at a predetermined speed and once wound up on a package. The thus-obtained unstretched yarns are stretched on an ordinary drawing machine. This stretching may also be carried out at a stroke after take-off of spun yarns, without winding up. Thus, the method comprising taking up yarns at a high speed of 4,000 m/min or higher and thus substantially stretching them to attain desired fiber performance characteristics may be employed.

The sectional composite structure of the above composite fibers may show concentric circles, eccentric circles, or a number of islands, and the sectional form of the fibers may be circular or deformed, for example triangular, flat, multifoliate, or the like.

As the textiles made of the fibers of the invention, there may be mentioned yarns, tows, tops, skeins, cloths, nonwoven fabrics, etc.

In the case of cloths among such textiles, the fibers of the invention as such are scarcely used singly for knitting or weaving. They are generally subjected to mixed knitting or weaving with natural fibers such as silk, cotton and wool, or synthetic fibers such as nylon, polyester and rayon, or to-mixed knitting or weaving in a form processed, for example, by covering, entangling or twisting with such fibers. The fibers may take the yarn form of filaments or staples, and the forms of cloths obtainable in the conventional manner include knit fabrics and woven fabrics. The knit fabrics may have any structure selected according to the intended use thereof, for example single plain knitting stitch, moss double rib stitch, smooth, pique or like fancy stitch, tricot half or like fancy stitch, raschel power net stitch, satin stitch, or tulle stitch and, in the case of woven fabrics, plain weave, twill weave, sateen weave or like fancy weave, for example. As for the cloth elongation, knit fabrics preferably show a percent elongation of 30 to 300% in the direction in which elongation is required, while woven fabrics preferably show a stretchability of 5 to 100% or are stretchable in two directions.

As the uses of the cloths among the textile industry products mentioned above, there may be mentioned clothing (legwear, innerwear, sportswear, etc.), and medical devices (bandages, tapings, etc.).

The legwears include, for example, stockings, socks, tights, etc., the innerwears include, for example, underwear, shorts, body fur, etc., and the sportswears include, for example, spats, leotards, etc. These are used for preventing the skin to be exposed to the open air, for preserving warmth, for keeping figure or making the body look thinner and/or for the like aims. The fibers of the invention have antistatic effects and, therefore, can prevent the skirt from clinging around the pantyhose due to static electricity generation or can prevent friction-due electrostatic shock, for example.

As the applications of the nonwoven fabrics, there may be mentioned tablecloths, napkins, carpets, synthetic leathers, artificial leathers, and the like.

Further, moisture-absorbing/releasing, dyeable sheets, which are excellent in moisture-absorbing/releasing properties and dyeability and in sheet characteristics, can be obtained by using the polyurethane resin (U) singly or by incorporating the same in another sheet-forming polymer.

As for the proportion of (U) when this is incorporated in another sheet-forming polymer, a preferred lower limit is 3% by weight, more preferably 7% by weight, relative to the total polymer weight, from the moisture-absorption/release viewpoint, while a preferred upper limit is 40% by weight, more preferably 30% by weight, from the viewpoint of sheet physical properties.

As the above-mentioned other sheet-forming polymer, there may be mentioned polyolefins (polyethylene, polypropylene, etc.), polyamides (6-nylon, 6,6-nylon, etc.), polyesters (polyethylene terephthalate, polybutylene terephthalate, etc.), and the like.

As the textile comprising the sheet of the invention, there may be mentioned synthetic leathers, artificial leathers, and the like. The synthetic leathers or artificial leathers can be produced by any of the conventional processes, for example the dry treatment process and wet treatment process.

As the dry treatment process, there may be mentioned, for example, the process comprising coating a substrate with a blowing agent-containing polyurethane resin solution, heating the resulting sheet in an oven at a high temperature and thus decomposing the blowing agent and causing foaming, and applying a polyurethane resin solution onto the thus-formed sponge layer to give a compact skin layer on the surface.

As the wet treatment process, there may be mentioned the processes described in Japanese Kokai Publication Sho-54-38996, for example the process comprising dipping a polyurethane resin solution-coated substrate in a coagulation bath, and the process comprising causing partial coagulation to occur using steam, followed by dipping in a coagulation bath. The coagulation baths for causing coagulation of the polyurethane resin include water, methanol and other nonsolvents or poor solvents for polyurethane resins.

The applications of the textiles comprising the above-mentioned sheet include bags, belts, clothing, furniture, automotive sheets, etc.

BEST MODE FOR CARRYING OUT THE INVENTION

The following examples further illustrate the present invention. They are, however, by no means limitative of the scope of the invention.

The moldings (sheets) or circular knitted fabrics described in the examples and comparative examples were evaluated for physical properties by the following methods.

1. Moisture absorption rate, moisture absorption/release rate

Sample morphology Sheet: length×width×thickness=100×50×0.2 (mm) Circular knitted fabric: length×width=100×50 (mm)

Moisture absorption/release rate (%)=b−a where a is the moisture absorption rate (%) after 24 hours of standing of the sheet or circular knitted fabric in an atmosphere of 20° C. and 65% relative humidity, whose value is obtained according to the formula given below:

a=(weight after standing−weight in absolute dry condition)×100/weight in absolute dry condition and b is the moisture absorption rate (%) after 24 hours of standing of the sheet or circular knitted fabric in an atmosphere of 30° C. and 90% relative humidity, whose value is obtained according to the formula given below:

b=(weight after standing−weight in absolute dry condition)×100/weight in absolute dry condition.

Here, the weight after standing and the weight in absolute dry condition are the weights of the sheet or circular knitted fabric as measured under the following respective conditions.

Weight after standing: the weight of the sheet or circular knitted fabric as measured immediately after standing under the above conditions;

Weight in absolute dry condition: the weight of the sheet or circular knitted fabric as measured after allowing the same to stand in a constant-temperature drier at 105° C. for 1.5 hours, taking out and then allowing to stand in a desiccator containing a desiccant (e.g. silica gel) (20° C.) for 30 minutes.

2. Surface resistivity

The molded sheet sample was allowed to stand in an atmosphere of 20° C. and 60% relative humidity for 24 hours and then measured for surface resistivity in the same temperature and humidity atmosphere using a very high insulation resistance meter (product of Advantest Corp.).

3. Tensile elongation (1) After drying (allowing to stand in an atmosphere of 20° C. and 60% RH for 24 hours) and (2) in a wet state (after immersion in distilled water at 20° C. for 1 day), strength/elongation physical properties measurements were carried out according to JIS 1013 using an autograph [product of Shimadzu Corp. (AGS-500B)].

4. Fastness to light

Measurements were made according to JIS L 0842-1971 (fadeometer test).

5. Fastness to wet rubbing

Measurements were made according to JIS L 0849-1971 (gray scale test).

The dyed samples subjected to the above evaluations 4 and 5 were prepared by the following method of dyeing.

| Dyeing method | |
|---|---|
| (Dyeing conditions) | |
| Bath ratio | 1:50 |
| (Dye bath) | |
| Dye Kayacryl Red GL-ED (product of Nippon Kayaku Co., Ltd.) | 2.0% |

| -continued | |
|---|---|
| Dyeing method | |
| Acetic acid | 1.5% |
| Sodium acetate | 0.5% |
| Mirabilite | 1 g/L |

The sheet or circular knitted fabric was immersed in the dye bath at 60° C., and the temperature was raised to 80° C. over 10 minutes and then further raised to 120° C. over 40 minutes. Dyeing was carried out at this temperature for 30 minutes, and the sample was then washed with warm water at 60° C. for 10 minutes and dried.

[Sheet performance]

EXAMPLE 1

A reaction vessel equipped with a stirrer, thermometer and reflux condenser was charged with 148 parts of dimethyl 5-sulfoisophthalate sodium salt, 65.1 parts of EG and 820 parts of DMA, 0.4 part of manganese acetate was further added, and the transesterification reaction was carried out at 140 to 160° C. while removing the byproduct methanol. A composition (S1) comprising 0.3% of EG, 81.9% of DMA and 17.8% of 5-sulfoisophthalic acid ethylene glycol diester sodium salt was obtained as a pale yellow liquid.

Another reaction vessel equipped with a stirrer, thermometer and reflux condenser was charged with 340 parts of (S1), 9.5 parts of EG and 200 parts of PTMG (Mn 2,000; hereinafter the same shall apply), and the charge was mixed up uniformly to give a polyol component (A1). Thereto was added 110 parts of diphenylmethanediisocyanate and 610.6 parts of DMA, and the reaction was carried out at 60° C. to give a 30% polyurethane resin solution (U1).

The polyurethane resin obtained had an Mn of 45,000. (U1) was cast onto a glass sheet and dried under reduced pressure (0.005 MPa) at 70° C. for 3 hours to give a 200-μm-thick sheet.

EXAMPLE 2

A polyol component (A2) was obtained in the same manner as in Example 1 except that 170 parts of (S1), 10 parts of EG and 200 parts of PTMG and that 30 parts of PEG (Mn 400; hereinafter the same shall apply) was further used. By adding thereto 107.5 parts of diphenylmethanediisocyanate and 743.5 parts of DMA, a 30% polyurethane resin solution (U2) was obtained in the same manner as in Example 1. The polyurethane resin obtained had an Mn of 55,000. Using (U2), a 200-μm-thick sheet was obtained in the same manner as in Example 1.

Comparative Example 1

A reaction vessel equipped with a stirrer, thermometer and reflux condenser was charged with 16 parts of EG and 200 parts of PTMG, followed by uniformly mixing up to give a polyol component (A3). Thereto were added 90 parts of diphenylmethanediisocyanate and 714 parts of DMA, and the reaction was carried out at 60° C. to give a 30% polyurethane resin solution (U3). The polyurethane resin obtained had an Mn of 60,000.

Using (U3), a 200-μm-thick sheet was obtained in the same manner as in Example 1.

Comparative Example 2

A polyol component (A4) was obtained in the same manner as in Example 1 except that, in the step of polyol component preparation, 10.5 parts of EG, 200 parts of PTMG and, further, 60 parts of PEG were used and that (S1) was not used. Thereto were added 105 parts of diphenylmethanediisocyanate and 876.2 parts of DMA, and a 30% polyurethane resin solution (U4) was obtained in the same manner as in Example 1. The polyurethane resin obtained had an Mn of 60,000. Using (U4), a 200-μm-thick sheet was obtained in the same manner as in Example 1.

Comparative Example 3

A reaction vessel equipped with a stirrer, thermometer and reflux condenser was charged with 296 parts of dimethyl 5-sulfoisophthalate sodium salt, 17.7 parts of EG, 110 parts of neopentyl glycol and 194 parts of dimethyl isophthalate, 1 part of manganese acetate was further added, and the reaction was carried out at 200° C. and, after distilling off the theoretical amount of methanol, a polyester diol was obtained. The polyester obtained had a hydroxyl value of 56.1 and an acid value of 0.5.

Then, another reaction vessel equipped with a stirrer, thermometer and reflux condenser was charged with 16 parts of EG and 200 parts of the previously obtained polyester diol. After uniformly mixing up, a polyol component (AS) was obtained. Thereto were added 90 parts of diphenylmethanediisocyanate and 714 parts of DMA, and the reaction was carried out at 60° C. to give a 30% polyurethane resin solution (U5). The polyurethane resin obtained had an Mn of 55,000. Using (U5), a 200-μm-thick sheet was obtained in the same manner as in Example 1.

The results of evaluation of the sheets obtained in Examples 1 and 2 and Comparative Examples 1 to 3 are shown in Table 1.

uct of Sanyo Chemical Industries, Ltd.) and 5% of Sandet LNM (product of Sanyo Chemical Industries, Ltd.) at 80° C. for 45 minutes, washed with warm water, and then evaluated. The results of evaluation are shown in Table 2.

TABLE 2

| | Moisture absorption rate (%) | | Moisture absorption/ release rate (%) | Fastness to wet rubbing | Fastness to light |
|---|---|---|---|---|---|
| | (b) | (a) | (b) − (a) | (class) | (class) |
| Example 3 | 7.1 | 2.3 | 4.8 | 5 | 5 |
| Example 4 | 6.2 | 2.0 | 4.2 | 5 | 4 |
| Comparative Example 4 | 0.8 | 0.4 | 0.4 | 2 | 1 |
| Comparative Example 5 | 3.4 | 1.4 | 2.0 | 2 | 1 |
| Comparative Example 6 | 6.0 | 1.8 | 4.2 | 4 | 3 |

[Clothing Performance]

EXAMPLE 5

Covering yarns (SCY) consisting of the fibers obtained in Example 3 and Toray Industries' nylon fibers (22 decitex) (22 decitex blending percentage 36% by weight) were formed using an SCY manufacturing machine and knitted to give zokki pantyhoses.

TABLE 1

| | Moisture absorption rate (%) | | Moisture absorption/ release rate (%) | Surface resistivity ($\Omega$) | Tensile elongation (%) in dry condition | Tensile elongation (%) in wet condition | Fastness to wet rubbing (class) | Fastness to light (class) |
|---|---|---|---|---|---|---|---|---|
| | (b) | (a) | (b) − (a) | | | | | |
| Example 1 | 6.1 | 2.1 | 4.0 | $1.7 \times 10^{12}$ | 570 | 600 | 5 | 5 |
| Example 2 | 5.2 | 1.7 | 3.5 | $1.8 \times 10^{12}$ | 600 | 590 | 5 | 4 |
| Comparative Example 1 | 0.7 | 0.4 | 0.3 | $1.5 \times 10^{14}$ | 600 | 600 | 2 | 1 |
| Comparative Example 2 | 3.0 | 1.3 | 1.7 | $1.9 \times 10^{13}$ | 650 | 500 | 2 | 1 |
| Comparative Example 3 | 5.0 | 1.5 | 3.5 | $1.5 \times 10^{12}$ | 550 | 450 | 5 | 4 |

[Circular Knitted Fabric Performance]

EXAMPLES 3 AND 4

Comparative Examples 4 to 6

Wet spinning was carried out using (U1) to (U5) as spinning materials. Using a nozzle with a diameter of 0.5 mm as a spinneret, 40-denir monofilaments were spun out at a spinning rate of 500 m/minute to give polyurethane fibers. Round braids were produced from the respective fibers obtained using a circular knitting machine. They were scoured in an aqueous solution containing 30% of Emulmin NL-70 (prod-

EXAMPLE 6

Tricot fabrics consisting of the fibers obtained in Example 3 and 22 decitex fibers (22 decitex blending percentage 16% by weight) were formed using a tricot machine, and pieces of innerwear were sewn.

Comparative Example 7

Using the fibers obtained in Comparative Example 4, zokki pantyhoses were obtained in the same manner as in Example 5.

Comparative Example 8

Using the fibers obtained in Comparative Example 4, innerwear pieces were obtained in the same manner as in Example 6.

The zokki pantyhoses obtained in Example 5 showed no adhesion of dirt or waste fibers and were superior in antistatic properties as compared with those obtained in Comparative Example 7.

The innerwear pieces obtained in Example 6 were pleasant to the skin, without causing sweaty or sticky feeling after taking exercise, as compared with those obtained in Comparative Example 8.

[Synthetic Leather Performance]

EXAMPLE 7

A coating fluid was prepared by mixing up 100 parts of (U1), 150 parts of DMA, 2 parts of Sanmorin OT-70 (film-forming aid, product of Sanyo Chemical Industries, Ltd.), 1 part of Ionet S-80 (film-forming aid, product of Sanyo Chemical Industries, Ltd.) and 3 parts of a toner. The coating fluid was applied to a nonwoven polyester fabric substrate to a coating weight of 900 g/m², followed by 10 minutes of immersion in a 10% aqueous solution of DMA at 20° C. Then, the coated substrate was immersed in warm water at 50° C. for 20 minutes to thoroughly remove the solvent and then dried in a drum drier at 120° C. to give a wet type synthetic leather 1. Shoe backings were manufactured using the wet type synthetic leather 1.

Comparative Example 9

A wet type synthetic leather 2 was obtained in the same manner as in Example 7 except that (U4) was used in lieu of (U1). Shoe backings were manufactured using the wet type synthetic leather 2.

The shoe backings manufactured using the wet type synthetic leather 1 were pleasant to the skin, without causing sweaty or sticky feeling after taking exercise, as compared with the shoe backings manufactured using the wet type synthetic leather 2.

INDUSTRIAL APPLICABILITY

The polyol component for polyurethane formation or anionic diol composition according to the invention produces the following effects and are therefore very useful.

Polyol component for polyurethane formation:

(1) It makes it possible to form polyurethane resins excellent in moisture absorbing/releasing properties and/or dyeability and excellent in mechanical characteristics and hydrolysis resistance as well.

(2) The polyurethane resins obtained can be provided with such characteristics as good antistatic properties, hydrophilicity, fog resistance and dew condensation resistance.

(3) By incorporating the polyurethane resins obtained, as modifiers, in thermoplastic resins, it becomes possible to obtain thermoplastic resin compositions having the same good resin physical properties and excellent characteristics as mentioned above under (2).

Anionic diol composition:

(1) The free diol content therein is low, and the degree of freedom in resin modification is great.

The invention claimed is:

1. A fiber, sheet or textile
which comprises an unfoamed or foamed, anionic group-containing polyurethane resin wherein
said polyurethane resin has a protonic acid (salt) content of 0.01 to 7 millimoles/g and is obtained by reacting a polyol component with a polyisocyanate component; and
said polyol component comprises at least 15 mole % of an anionic diol (A1) represented by the general formula:

$$\text{HO-A-OCO-Z[-Q}^-\text{(M}^{h+}\text{)}_{1/h}]_n\text{-COO-A-OH} \tag{1}$$

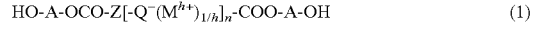

in the formula, n represents an integer of 1 to 4; h represents 1 or 2; $M^{h+}$ represents a cation with a valence of h; $Q^-$ represents an anion group of a protonic acid having a pKa of −10 to 4: Z represents the residue of a dicarboxylic acid (a1) having n protonic acid (salt) groups: and A represents the residue of at least one diol (a2) selected from the group consisting of hydrocarbon diols and (poly)oxyalkylene diols.

2. A fiber, sheet or textile which comprises an unfoamed or foamed, anionic group-containing polyurethane resin, wherein
said polyurethane resin has a protonic acid (salt) content of 0.01 to 7 millimoles/g and is obtained by reacting an anionic diol composition with a polyisocyanate component; and
said anionic diol composition comprises
an anionic diol (Al) represented by the general formula:

$$\text{HO-A-OCO-Z[-Q}^-\text{(M}^{h+}\text{)}_{1/h}]_n\text{-COO-A-OH} \tag{1}$$

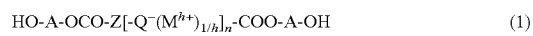

in the formula, n represents an integer of 1 to 4; h represents 1 or 2; $M^{h+}$ represents a cation with a valence of h; $Q^-$ represents an anion group of a protonic acid having a pKa of −10 to 4; Z represents the residue of a dicarboxylic acid (a1) having n protonic acid (salt) groups; and A represents the residue of at least one diol (a2) selected from the group consisting of hydrocarbon diols and (poly)oxyalkylene diols, and
another active hydrogen atom-containing compound (A2) and/or a compounding ingredient (A3) selected from the group consisting of inert solvents (A31) and additives (A32),
with the content of (A1) being at least 15 mole % and with the content of (A2) being not higher than 85 mole % based on the total number of moles of (A1) and (A2).

3. The fiber, sheet or textile according to claim 1 or 2, wherein
the residue Z is a hydrocarbon group containing 3 to 16 carbon atoms, and
said hydrocarbon group may optionally being substituted with an alkoxy, hydroxyl, cyano, aldehyde or nitro group, or a halogen atom.

4. The fiber, sheet or textile according to claim 1 or 2, wherein $Q^-$ is —$SO_3^-$—,—O—$SO_3^-$ or —NH—$SO_3^-$.

5. The fiber, sheet or textile according to claim 1 or 2, wherein (a1) is 5-sulfoisophthalic acid or a salt thereof.

6. The fiber, sheet or textile according to claim 1 or 2, wherein said anionic diol (A1) is obtained by reacting a diol (a2) represented by the formula:

$$\text{HO-A-OH} \tag{2}$$

with a dicarboxylic acid (a1) having n protonic acid (salt) groups as represented by the general formula:

$$\text{HOOC-Z[-Q}^-\text{(M}^{h+}\text{)}_{1/h}]_n\text{-COOH} \tag{3}$$

or an ester-forming derivative thereof, in a mole ratio of 1.8 to 3/1 in an inert solvent in the presence or absence of a catalyst.

7. The fiber, sheet or textile according to claim 1, which further comprises at most 85 mole % of another active hydrogen atom-containing compound (A2), and said (A2) being at least one species selected from the group consisting of high-molecular-weight polyols (A21) having a hydroxyl group equivalent of at least 250, low-molecular-weight polyols (A22) having a hydroxyl group equivalent of less than 250, and other active hydrogen atom-containing compounds (A23).

8. The fiber, sheet or textile according to claim 7, wherein (A21) is at least one species selected from the group consisting of polyether polyols, polyester polyols, polybutadienepolyols, acrylic polyols and polymer polyols.

9. The fiber, sheet or textile according to claim 2, wherein (A31) is selected from the group consisting of dimethylformamide and active hydrogen atom-free organic solvents.

* * * * *